(12) United States Patent
Kato et al.

(10) Patent No.: US 9,704,074 B2
(45) Date of Patent: Jul. 11, 2017

(54) IMAGE PROCESSING APPARATUS AND METHOD FOR QUANTIZING FIRST AND SECOND MULTI-VALUED DATA

(71) Applicant: CANON KABUSHIKI KAISHA, Tokyo (JP)

(72) Inventors: Minako Kato, Kawasaki (JP); Masao Kato, Kawasaki (JP); Yumi Yanai, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/991,618

(22) Filed: Jan. 8, 2016

(65) Prior Publication Data

US 2016/0210539 A1    Jul. 21, 2016

(30) Foreign Application Priority Data

Jan. 21, 2015  (JP) .................................. 2015-009697

(51) Int. Cl.
*B41J 2/205* (2006.01)
*G06K 15/02* (2006.01)

(52) U.S. Cl.
CPC ................................ *G06K 15/1876* (2013.01)

(58) Field of Classification Search
CPC combination set(s) only.
See application file for complete search history.

(56) References Cited

U.S. PATENT DOCUMENTS

| 6,738,160 | B1 | 5/2004 | Kato |
|---|---|---|---|
| 6,867,884 | B1 | 3/2005 | Rozzi |
| 7,099,046 | B2 | 8/2006 | Kato |
| 7,312,901 | B2 | 12/2007 | Yamada |
| 7,548,346 | B2 | 6/2009 | Yamada |
| 7,672,011 | B2 | 3/2010 | Kato |
| 7,855,809 | B2 | 12/2010 | Kato |
| 7,859,723 | B2 | 12/2010 | Yamada |
| 7,965,418 | B2 | 6/2011 | Yamada |

(Continued)

OTHER PUBLICATIONS

U.S. Appl. No. 14/971,271, filed Dec. 16, 2015.

(Continued)

*Primary Examiner* — Barbara Reinier
(74) *Attorney, Agent, or Firm* — Fitzpatrick, Cella, Harper & Scinto

(57) ABSTRACT

An image processing apparatus has an acquisition unit configured to acquire first multi-valued data corresponding to a first colored ink to be precedently applied to a same area of the print medium, and second multi-valued data corresponding to a second colored ink to be applied to the print medium succeedingly to the first colored ink; and a quantization unit configured to convert the first multi-valued data to first quantized data designating printing or non-printing of dot using the first colored ink, and converts the second multi-valued data to second quantized data designating printing or non-printing of dot using the second colored data. The quantization unit quantizes the first multi-valued data and the second multi-valued data so as to, on the print medium, make dispersibility of dots to be printed based on the first quantized data higher than dispersibility of dots to be printed based on the second quantized data.

38 Claims, 17 Drawing Sheets

(56) References Cited

U.S. PATENT DOCUMENTS

2007/0109604 A1\* 5/2007 Marumoto ........... H04N 1/4051
358/3.13
2014/0139885 A1\* 5/2014 Nakagawa ........... H04N 1/4051
358/3.14

OTHER PUBLICATIONS

U.S. Appl. No. 14/971,277, filed Dec. 16, 2015.
U.S. Appl. No. 14/971,287, filed Dec. 16, 2015.
Robert Ulichney, "Digital Halftoning", The MIT Press, Cambridge, MA., London, England.
Robert Ulichney, "The void-and-cluster method for dither array generation", Proceedings SPIE, Human Vision, Visual Processing, Digital Displays IV, vol. 1913, pp. 332-343, 1993.

\* cited by examiner

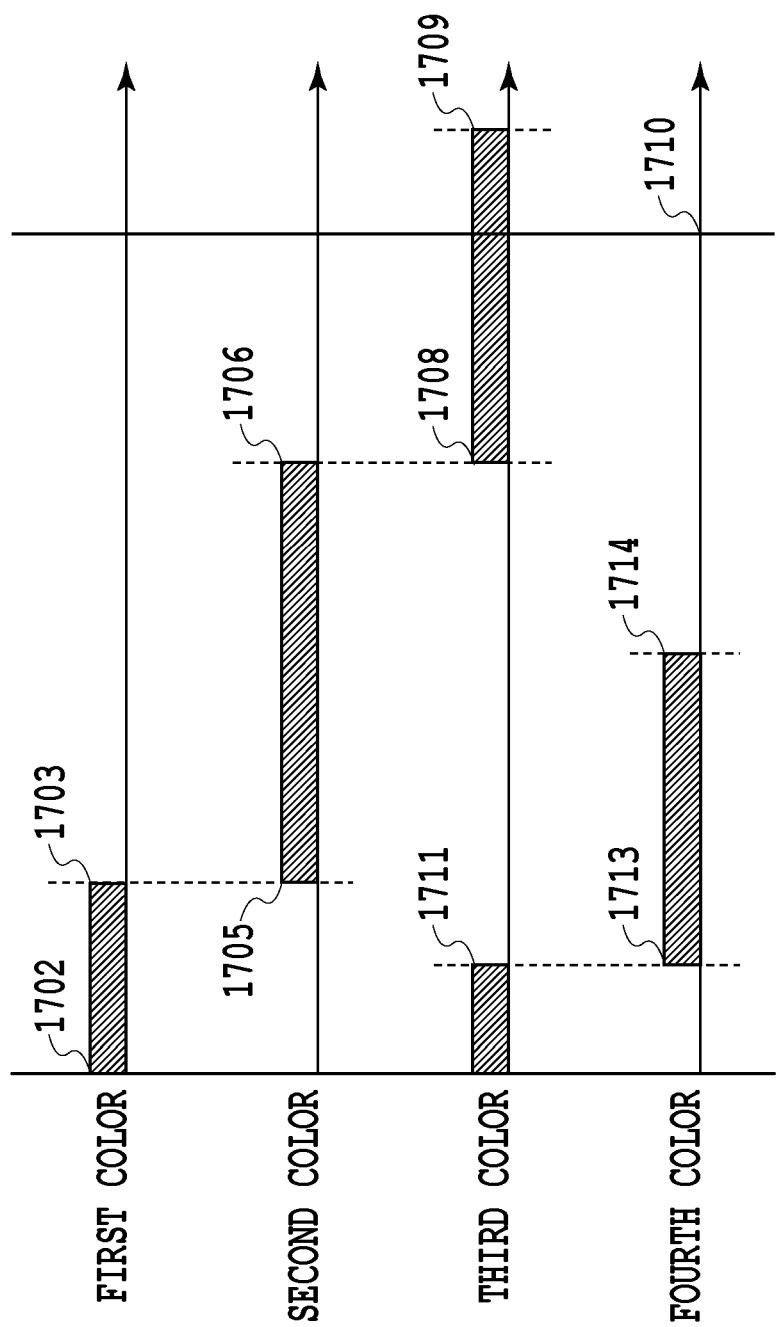

| 36 | 36 | 36 | 36 | 36 | 36 | 36 | 36 | 36 | 36 |
|---|---|---|---|---|---|---|---|---|---|
| 36 | 36 | 36 | 36 | 36 | 36 | 36 | 36 | 36 | 36 |
| 36 | 36 | 36 | 36 | 36 | 36 | 36 | 36 | 36 | 36 |
| 36 | 36 | 36 | 36 | 36 | 36 | 36 | 36 | 36 | 36 |
| 36 | 36 | 36 | 36 | 36 | 36 | 36 | 36 | 36 | 36 |
| 36 | 36 | 36 | 36 | 36 | 36 | 36 | 36 | 36 | 36 |
| 36 | 36 | 36 | 36 | 36 | 36 | 36 | 36 | 36 | 36 |
| 36 | 36 | 36 | 36 | 36 | 36 | 36 | 36 | 36 | 36 |
| 36 | 36 | 36 | 36 | 36 | 36 | 36 | 36 | 36 | 36 |
| 36 | 36 | 36 | 36 | 36 | 36 | 36 | 36 | 36 | 36 |

| 24 | 138 | 55 | 230 | 183 | 66 | 238 | 189 | 75 | 25 |
|---|---|---|---|---|---|---|---|---|---|
| 215 | 180 | 12 | 158 | 88 | 207 | 115 | 4 | 155 | 215 |
| 121 | 71 | 248 | 106 | 45 | 26 | 168 | 59 | 250 | 43 |
| 157 | 33 | 134 | 189 | 220 | 143 | 229 | 93 | 135 | 109 |
| 196 | 224 | 84 | 7 | 120 | 71 | 183 | 16 | 204 | 66 |
| 17 | 60 | 164 | 209 | 53 | 246 | 105 | 39 | 162 | 244 |
| 112 | 251 | 98 | 145 | 31 | 172 | 139 | 215 | 80 | 121 |
| 215 | 175 | 23 | 199 | 235 | 88 | 10 | 190 | 54 | 224 |
| 77 | 50 | 133 | 72 | 116 | 59 | 126 | 232 | 26 | 145 |
| 157 | 192 | 228 | 0 | 178 | 208 | 151 | 99 | 169 | 86 |

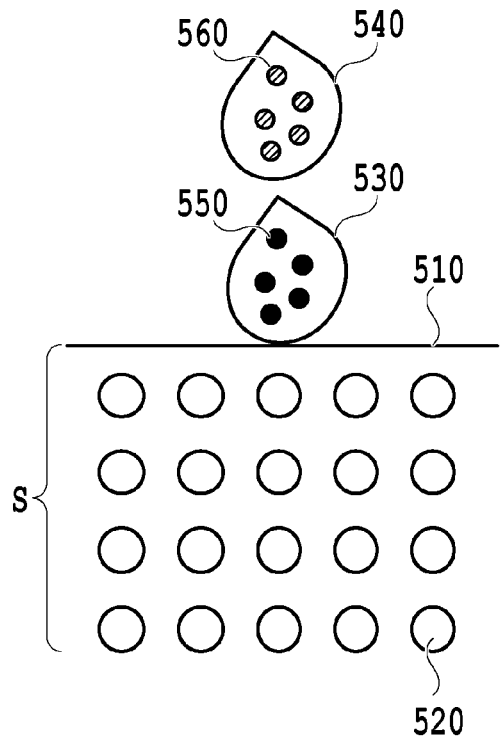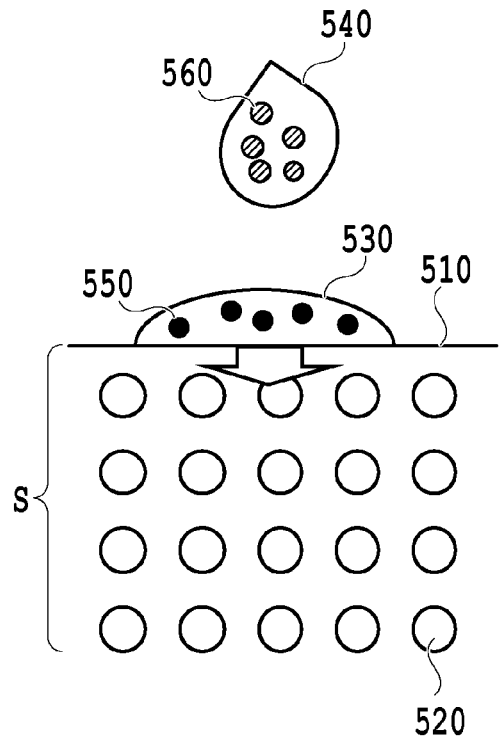
FIG.14A  FIG.14B
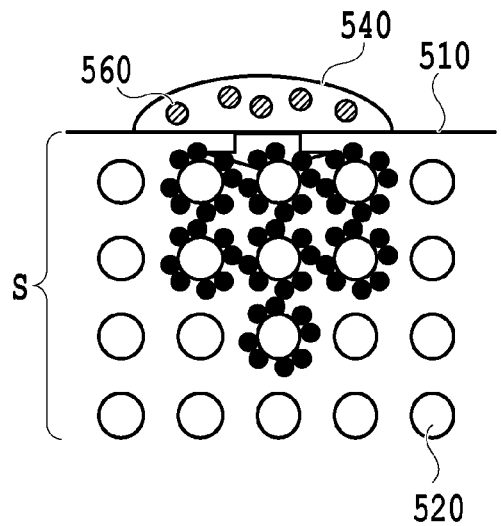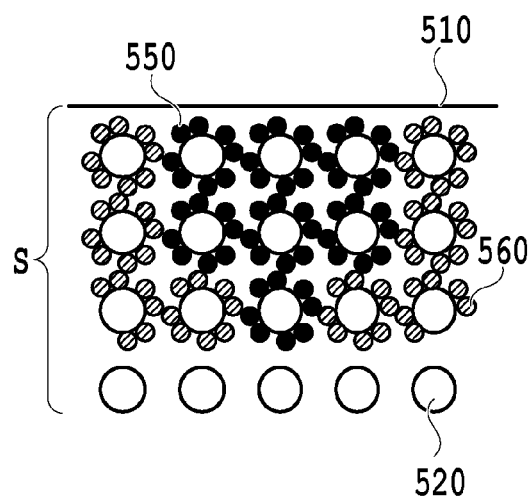
FIG.14C  FIG.14D

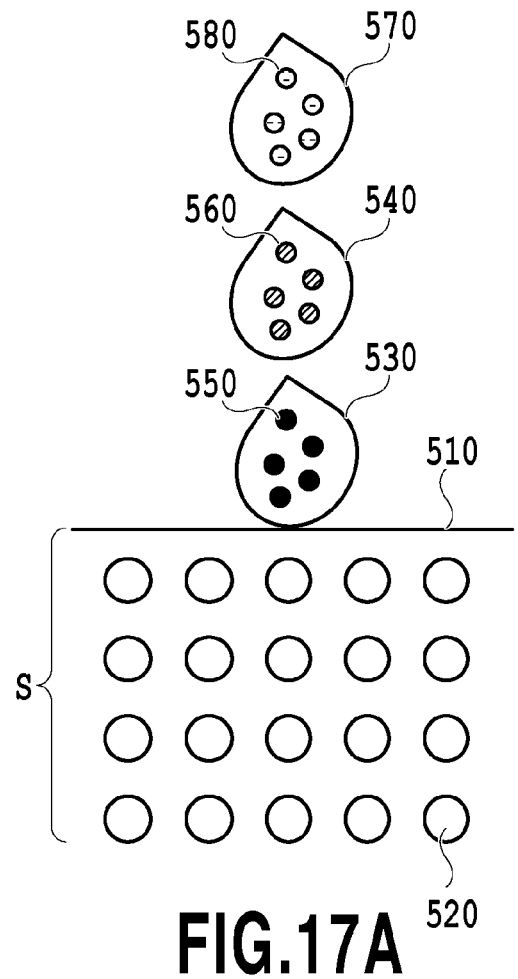
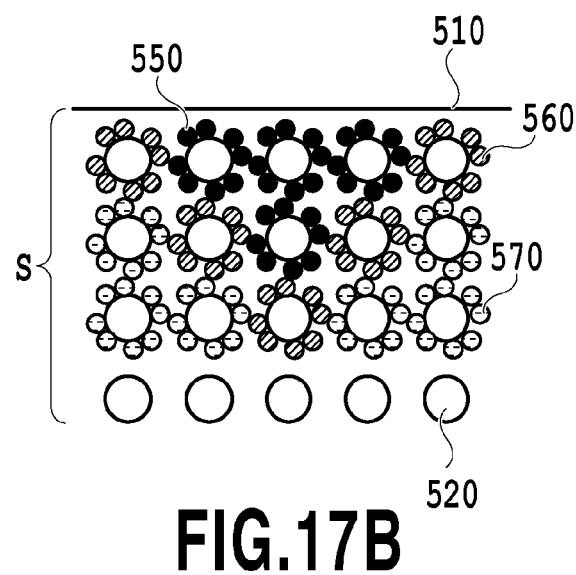

IMAGE PROCESSING APPARATUS AND METHOD FOR QUANTIZING FIRST AND SECOND MULTI-VALUED DATA

BACKGROUND OF THE INVENTION

Field of the Invention

The present invention relates to an image processing apparatus, image processing method, and storage medium for performing a quantization process to form an image on a print medium.

Description of the Related Art

In the case of using a pseudo gradation method to print an image, it is necessary to quantize multi-valued image data, and as a quantization method used for the quantization, an error diffusion method and a dither method are known. In particular, the dither method that compares a preliminarily stored threshold value and a gradation value of multi-valued data with each other to determine dot printing or non-printing has a small processing load as compared with the error diffusion method, and is widely used in many image processing apparatuses. In the case of such a dither method, in particular, dot dispersibility in low gradation range becomes problematic; however, as a threshold value matrix for obtaining preferable dot dispersibility, a threshold value matrix having blue noise characteristics is proposed.

FIGS. 10A to 10C are diagrams for explaining a dither process using a threshold value matrix having blue noise characteristics. FIG. 10A illustrates an example of image data to be inputted into a 10-pixel×10-pixel area. This example shows a state where a gradation value of "36" is inputted into all the pixels. FIG. 10B illustrates a threshold value matrix prepared corresponding to the above 10-pixel× 10-pixel area. Each of the pixels is related to any of threshold values of 0 to 254. In the dither method, in the case where a gradation value indicated by multi-valued image data is larger than a threshold value, a corresponding pixel is designated as dot printing "1". On the other hand, in the case where a gradation value indicated by multi-valued image data is equal to or less than a threshold value, a corresponding pixel is designated as dot non-printing "0". FIG. 10C illustrates a quantization result based on the dither method. Pixels representing printing "1" are indicated in gray, and pixels representing non-printing "0" are indicated in white. The distribution of printing "1" pixels as seen in FIG. 10C changes depending on threshold value arrangement in the threshold value matrix. By using the threshold value matrix having blue noise characteristics as in FIG. 10B, even in the case where the same pieces of multi-valued data are inputted into a predetermined area as in FIG. 10A, the printing "1" pixels are arranged in a high dispersibility state as in FIG. 10C.

FIGS. 11A and 11B are diagrams illustrating blue noise characteristics and human visual characteristics or a human visual transfer function (VTF) at a visibility distance of 250 mm. In both of the diagrams, the horizontal axis represents a frequency (cycles/mm), indicating lower and higher frequencies toward the left and right of the graph, respectively. On the other hand, the vertical axis represents intensity (power) corresponding to each frequency.

Referring to FIG. 11A, the blue noise characteristics are characterized by, for example, a suppressed low frequency component, a rapid rise, and a flat high frequency component. Hereinafter, a frequency fg corresponding to a peak resulting from the rapid rise is referred to as a principal frequency. On the other hand, the human visual characteristics illustrated in FIG. 11B have high sensitivity in a lower frequency range, but sensitivity in a higher frequency range is low. That is, the lower frequency component is conspicuous, whereas the higher frequency component is inconspicuous. The blue noise characteristics are based on such visual characteristics, and adapted to, in the visual characteristics, hardly have power in the highly sensitive (conspicuous) lower frequency range, but have power in the low sensitive (inconspicuous) higher frequency range. For this reason, when a person visually observes an image subjected to a quantization process using a threshold value matrix having blue noise characteristics, dot deviation or periodicity is unlikely to be perceived, and the image is recognized as a comfortable image.

Note that the principal frequency fg is an average frequency when dispersing a predetermined number of dots as uniformly as possible; however, the principal frequency fg depends on dot density, i.e., gradation.

FIG. 12 is a diagram illustrating the relationship between dot density and a principal frequency fg. In the diagram, the horizontal axis represents a gray level g (i.e., the dot density), and the vertical axis represents the principal frequency fg at each gray level. The gray level g is given on the assumption that a state where dots are placed in all pixels in an image area corresponds to "1", a state where no dots are placed in all the pixels to "0", and a state where dots are placed in half of the pixels to "½". The principal frequency fg in this case can be expressed by Expression 1.

$$f_g = \begin{cases} \sqrt{g}\,|u| & g \le \frac{1}{2} \\ \sqrt{1-g}\,|u| & g > \frac{1}{2} \end{cases} \quad \text{(Expression 1)}$$

In Expression 1, u represents the reciprocal of a pixel spacing. As can be seen from FIG. 12 and Expression 1, the principal frequency fg takes the maximum value of fg=√(½)|u| at a gray level of g=½, i.e., when dots are arranged in 50% of the pixels in the entire pixel area. In addition, as the gray level g separates from ½, the principal frequency fg also gradually shifts toward the lower frequency side.

In the case of performing the dither process, by bringing a peak appearing in frequency characteristics close to a principal frequency, in particularly, in low gradation where visual sensitivity is high and dot density is low, dot distribution can be brought close to a shape having blue noise characteristics. That is, it is possible to achieve a visually preferable state where dots are uniformly arranged without local concentration of dots.

The blue noise characteristics as described above are defined and explained in many literatures such as Robert Ulichney, "Digital Halftoning", The MIT Press, Cambridge, Mass., London, England. As a method for preparing a threshold value matrix while controlling frequency components, including blue noise characteristics, a void-and-cluster method can be employed. The details of a method for preparing a threshold value matrix using the void-and-cluster method are disclosed in Robert Ulichney, "The void-and-cluster method for dither array generation, Proceedings SPIE, Human Vision, Visual Processing, Digital Displays IV, vol. 1913, pp. 332-343, 1993".

However, even in the case of using a dither matrix having blue noise characteristics, using multiple color materials makes graininess conspicuous in some cases. Specifically, even though each color material (i.e., single color) results in preferable dispersibility based on the dither matrix, in the case of printing an image using the multiple color materials (i.e., mixed color), dispersibility is lost to make graininess conspicuous in some cases. This seems to be because threshold matrices prepared for the respective color materials do not have any mutual correlation.

U.S. Pat. No. 6,867,884 discloses a dither method for solving such a problem. Specifically, U.S. Pat. No. 6,867,884 discloses a method that prepares one common dither matrix having preferable dispersibility as in FIG. 10B, and performs a quantization process while offsetting mutual threshold values among multiple colors. According to U.S. Pat. No. 6,867,884 as described, dots of different colors are mutually exclusively printed in a high dispersibility state in a low gradation range, and therefore even in a mixed color image, preferable image quality can be achieved.

However, in the case of employing the method disclosed in U.S. Pat. No. 6,867,884 using a threshold value matrix having blue noise characteristics, and focusing on each of color materials, some difference in dispersibility or blue noise characteristics occurs among the color materials. This is because a first color directly using a threshold value in a dither matrix without any offset can enjoy the blue noise characteristics of the dither matrix, but a second or subsequent color using an offset threshold value loses the blue noise characteristics to some extent.

Meanwhile, it is known that in the case of an inkjet printing apparatus using inks (liquids) as color materials, the color chromogenic property, i.e., the conspicuousness of each dot is affected by the order of the color materials to be applied to a print medium.

FIGS. 14A to 14D are schematic diagrams for explaining the order of color materials to be applied to a print medium and states of permeation. The diagrams illustrate a state where a preceding ink 530 containing a first color material 550 and a succeeding ink 540 containing a second color material 560 are applied to substantially the same position of a print medium S in this order. Inside the print medium S, multiple adsorbents 520 are arranged to form an adsorbent layer. In the case where the print medium S is inkjet exclusive paper, the adsorbents 520 are made of alumina, silica, or the like. In the case where the print medium S is plain paper, the fibers of the paper serve as the adsorbents 520.

FIG. 14A illustrates a state immediately before the preceding ink 530 contacts a paper surface 510 of the print medium S. FIG. 14B illustrates a state immediately after the preceding ink 530 has contacted the paper surface 510. The preceding ink 530 having contacted the paper surface 510 spreads in the horizontal direction on the paper surface 510, and then permeates in the depth direction.

FIG. 14C illustrates a state immediately after the succeeding ink 540 has contacted the paper surface 510 with the preceding ink 530 permeating through the paper surface 510. The color material 550 contained in the preceding ink 530 adsorbs to adsorbents 520 near the paper surface 510, and moisture and solvent component other than the color material 550 permeate in the depth direction. On the other hand, the succeeding ink 540 having contacted the paper surface 510 spreads on the paper surface 510, and permeates in the depth direction.

FIG. 14D illustrates a state where the succeeding ink 540 has permeated through the print medium S. At timing when the succeeding ink 540 permeates, adsorbents 520 positioned near the paper surface 510 are mostly covered with the first color material 550. Accordingly, the color material 560 of the succeeding ink 540 cannot adsorb here, and therefore further travels around together with liquid components. Subsequently, the color material 560 passes the adsorbents 520 to which the first color material 550 adsorbs, and adsorbs nearby adsorbents 520. As a result, as compared with the first color material 550, the second color material 560 is unlikely to remain near the paper surface 510, and when observing the print medium S from above, has weak color chromogenic as compared with the first color material 550, making dots inconspicuous.

As described, in an image printed in accordance with an inkjet method, the conspicuousness of each dot depends on the order of inks to be applied to a print medium S. That is, the dispersibility of a preceding ink more significantly affects graininess than the dispersibility of a succeeding ink.

SUMMARY OF THE INVENTION

The present invention is made in order to solve the above-described problem. Therefore, an object of the present invention is to provide an image processing apparatus and image processing method that in either case of a dot pattern of each color material or the sum of dot patterns of multiple color materials, can output high-quality image of which the graininess is not easily perceived.

According to a first aspect of the present invention, there is provided an image processing apparatus for printing an image on a print medium with use of multiple inks, the image processing apparatus comprising: a quantization unit configured to convert the first multi-valued data to first quantized data designating printing or non-printing of dot of the first colored ink according to the first multi-valued data and a threshold value corresponding to a target pixel in a threshold value matrix configured by arraying multiple threshold values, and converts the second multi-valued data to second quantized data designating printing or non-printing of dot of the second colored ink according to the second multi-valued data and a threshold value corresponding to a target pixel in a threshold value matrix configured by arraying multiple threshold values, wherein the quantization unit quantizes the first multi-valued data and the second multi-valued data so as to, on the same area of the print medium, make dispersibility of dots to be printed based on the first quantized data higher than dispersibility of dots to be printed based on the second quantized data in a case where the dot of the first ink and the second ink at least partially overlap each other on the same area of the print medium.

According to a second aspect of the present invention, there is provided an image processing method for printing an image on a print medium with use of multiple inks, the image processing method comprising: an acquisition step of acquiring first multi-valued data corresponding to a first colored ink to be precedently applied to a same area of the print medium among the multiple inks, and second multi-valued data corresponding to a second colored ink to be applied to the print medium succeedingly to the first colored ink among the multiple inks; and a quantization step of converting the first multi-valued data to first quantized data designating printing or non-printing of dot of the first colored ink according to the first multi-valued data and a threshold value corresponding to a target pixel in a threshold value matrix configured by arraying multiple threshold values, and converting the second multi-valued data to second quantized data designating printing or non-printing of dot of the second colored ink according to the second multi-valued data and a threshold value corresponding to a target pixel in a threshold value matrix configured by arraying multiple threshold values, wherein the quantization step quantizes the first multi-valued data and the second multi-valued data so as to, on the same area of the print medium, make dispersibility of dots to be printed based on the first quantized data higher than dispersibility of dots to be printed based on the second quantized data in a case where the dot of the first ink and the second ink at least partially overlap each other on the same area of the print medium.

According to a third aspect of the present invention, there is provided a storage medium that stores a program for instructing a computer to function as respective units of an image processing apparatus for printing an image on a print medium with use of multiple inks, the image printing apparatus comprising: a quantization unit configured to convert first multi-valued data corresponding to a first colored ink precedently applied to a same area of the print medium among the multiple inks to first quantized data designating printing or non-printing of dot according to the first multi-valued data and a threshold value corresponding to a target pixel in a threshold value matrix configured by arraying multiple threshold values, and converts second multi-valued data corresponding to a second colored ink applied to the print medium succeedingly to the first colored ink among the multiple inks to second quantized data designating printing or non-printing of dot according to the second multi-valued data and a threshold value corresponding to a target pixel in a threshold value matrix configured by arraying multiple threshold values, wherein the quantization unit quantizes the first multi-valued data and the second multi-valued data so as to, on the same area of the print medium, make dispersibility of dots to be printed based on the first quantized data higher than dispersibility of dots to be printed based on the second quantized data in a case where the dot of the first ink and the second ink at least partially overlap each other on the same area of the print medium.

Further features of the present invention will become apparent from the following description of exemplary embodiments (with reference to the attached drawings).

BRIEF DESCRIPTION OF THE DRAWINGS

FIG. 5 is a diagram illustrating ranges of threshold values determined as printing (1) on an ink color basis;

FIGS. 14A to 14D are schematic diagrams illustrating the order of color materials to be applied and states of permeation;

FIGS. 17A and 17B are schematic diagrams illustrating color material application order and a permeation state.

DESCRIPTION OF THE EMBODIMENTS

First Embodiment

Figure 1:
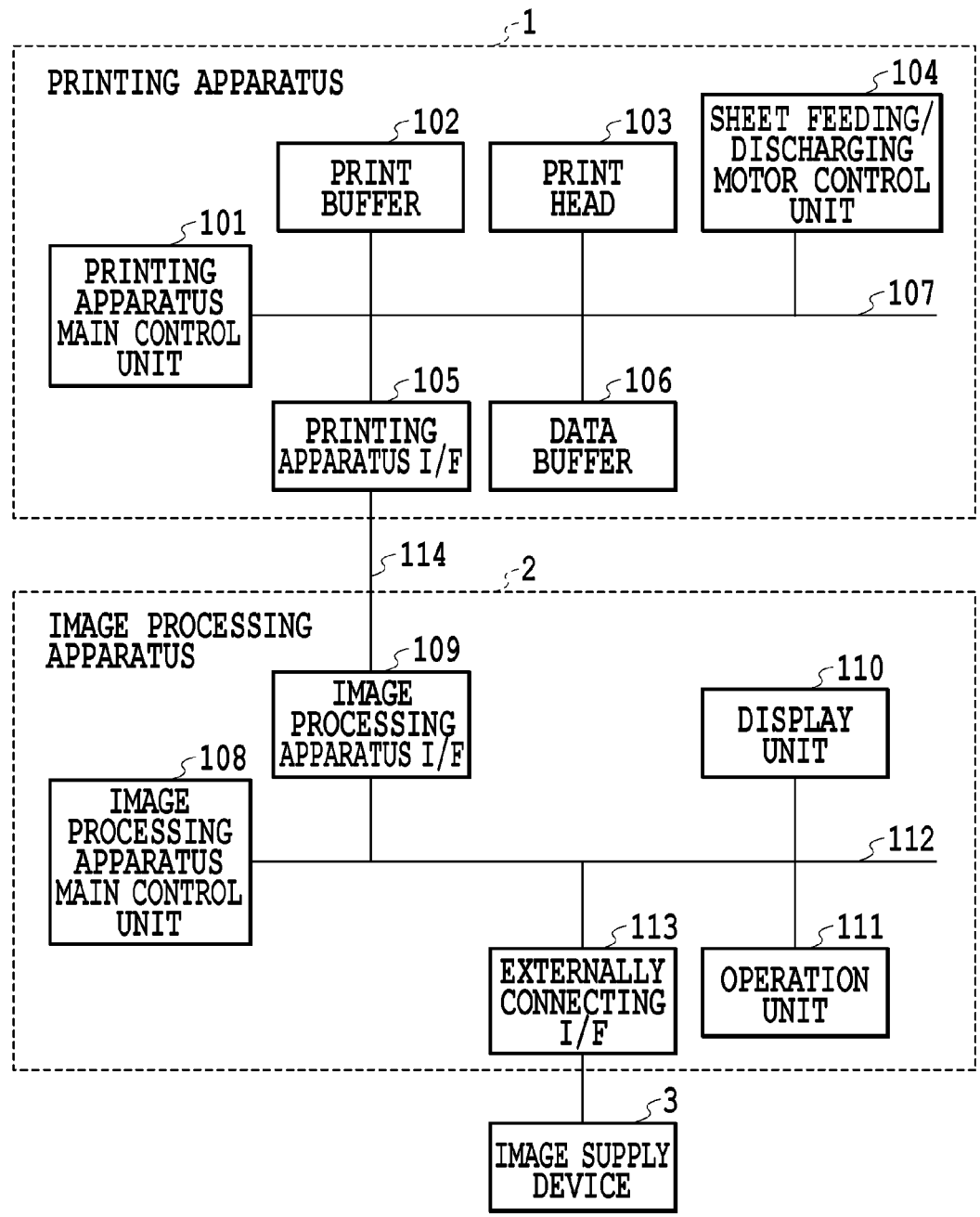
FIG. 1 is a block diagram illustrating the control configuration of an inkjet printing system.

FIG. 1 is a block diagram illustrating the control configuration of an inkjet printing system applicable to the present invention. The inkjet printing system in the present embodiment is configured to include an image supply device 3, an image processing apparatus 2, and an inkjet printing apparatus 1 (hereinafter also simply referred to as a printing apparatus). Image data supplied from the image supply device 3 is subjected to a predetermined image process in the image processing apparatus 2, then sent to the printing apparatus 1, and printed.

In the printing apparatus 1, a printing apparatus main control unit 101 is one for controlling the whole of the printing apparatus 1, and configured to include a CPU, ROM, RAM, and the like. A print buffer 102 can store image data before transfer to a print head 103 as raster data. The print head 103 is an inkjet type print head having multiple printing elements capable of ejecting inks as droplets, and in accordance with image data stored in the print buffer 102, ejects inks from respective printing elements. In the present embodiment, it is assumed that printing element arrays for four colors of cyan, magenta, yellow, and black are arrayed on the print head 103. The configuration of the print head will be described later in detail.

A sheet feeding/discharging motor control unit 104 controls conveyance of print media and sheet feeding/discharging. A printing apparatus interface (I/F) 105 transceives a data signal with the image processing apparatus 2. An I/F signal line 114 connects the both. As the I/F signal line 114, one specified by, for example, Centronics Data Computer Corporation can be applied. A data buffer 106 temporarily stores image data received from the image processing apparatus 2. A system bus 107 connects the respective functions of the printing apparatus 1.

Figure 2:
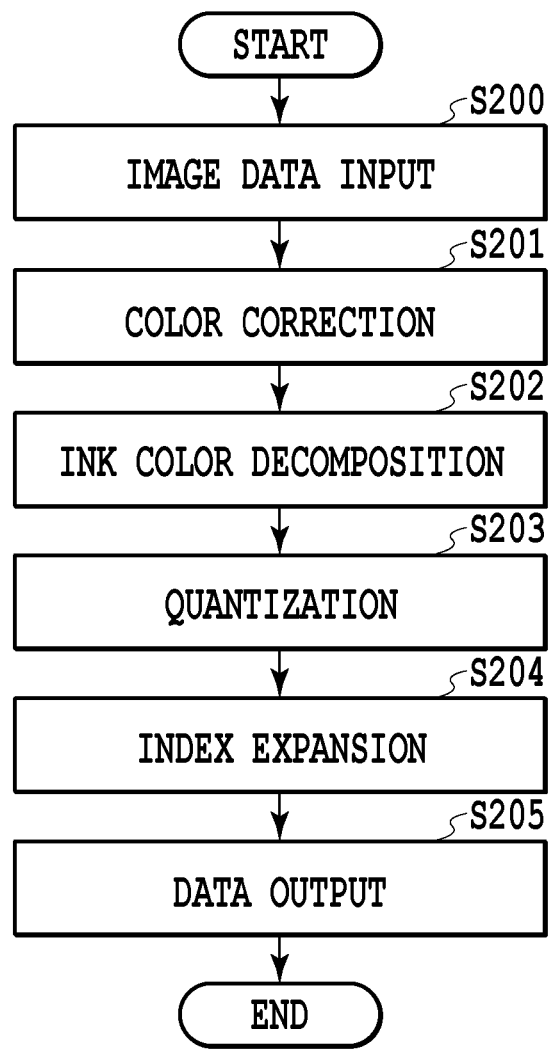
FIG. 2 is a flowchart for explaining an image data process.
Figure 3:
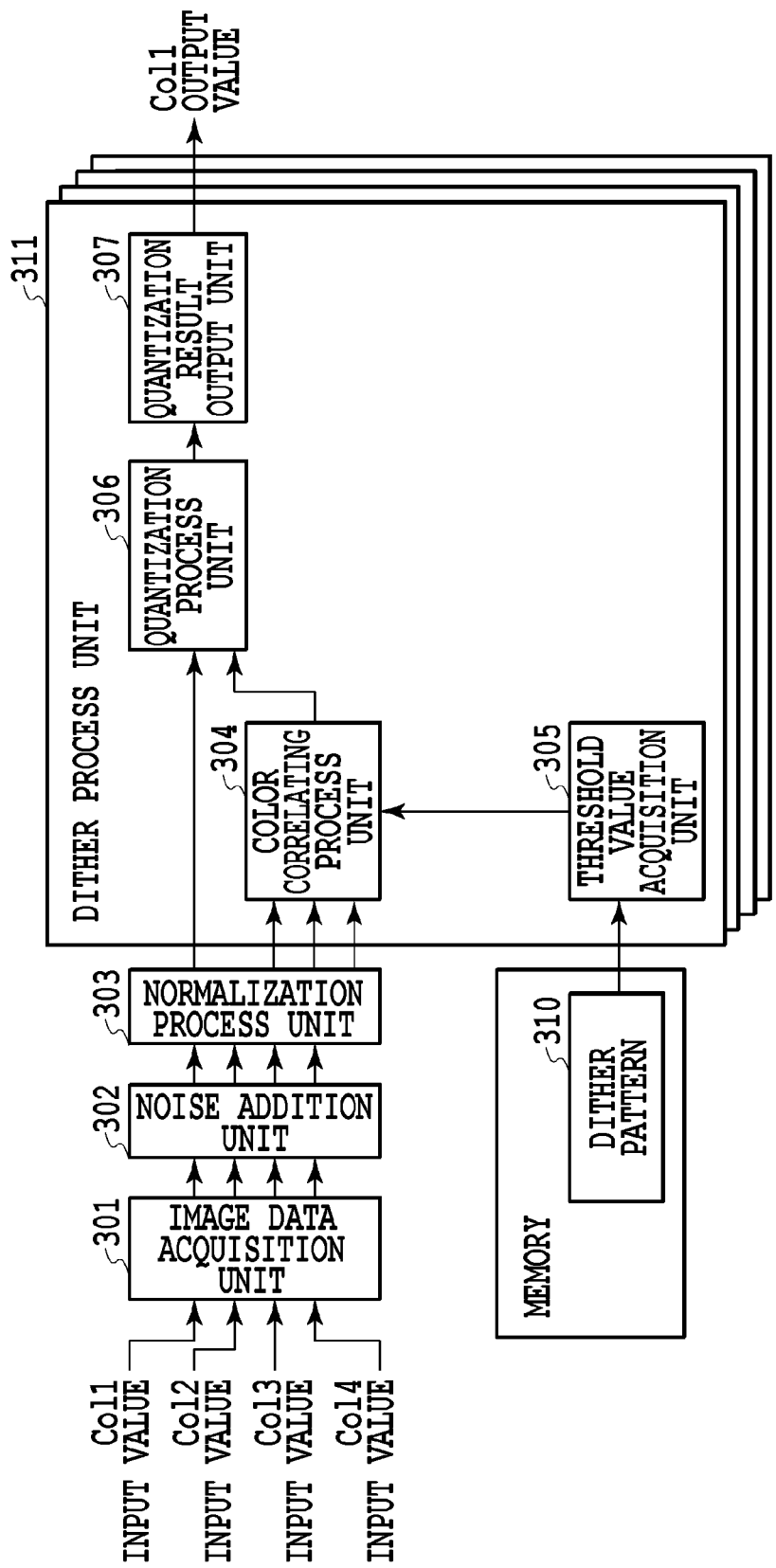
FIG. 3 is a block diagram for explaining the details of a quantization process.
Figure 4A:
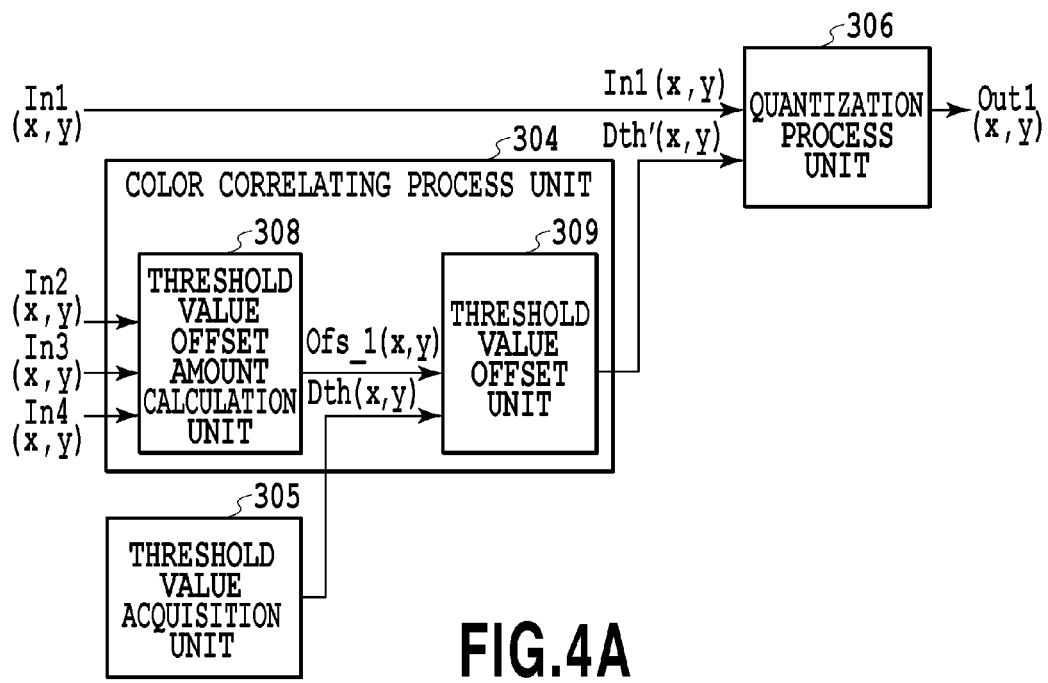
FIGS. 4A and 4B are diagrams illustrating the configuration of and processing steps by a color correlating process unit.
Figure 4B:
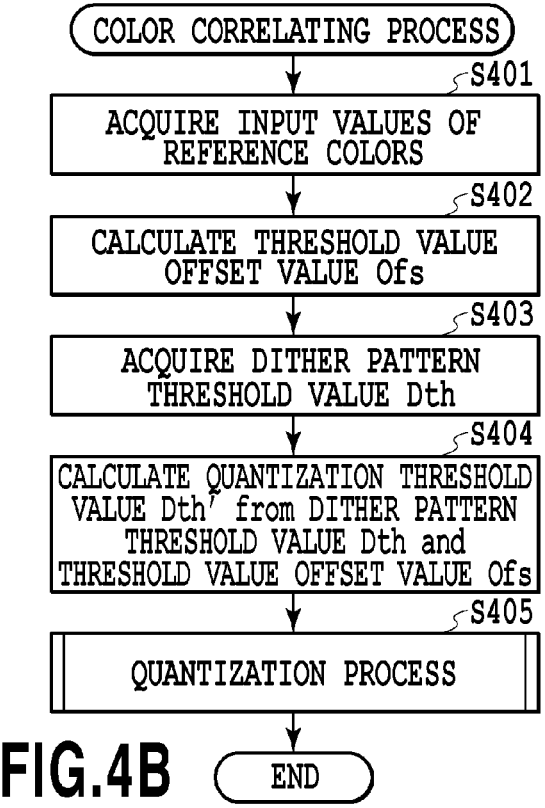
Figure 7:
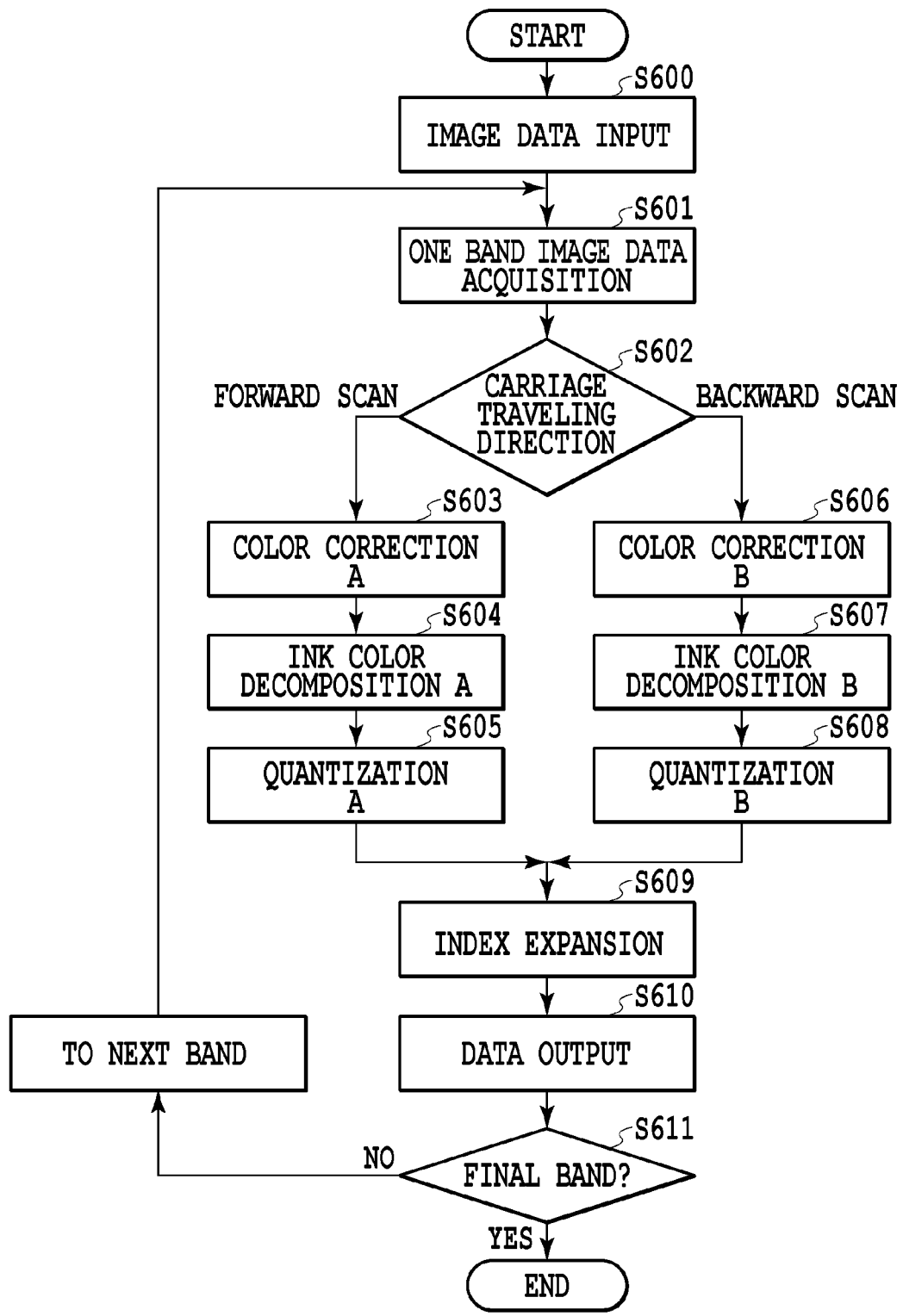
FIG. 7 is a flowchart for explaining an image data process in a second embodiment.

On the other hand, in the image processing apparatus 2, an image processing apparatus main control unit 108 is one for performing various processes on an image supplied from the image supply device 3, and thereby generating image data printable by the printing apparatus 1, and includes a CPU, ROM, RAM, and the like. The below-described characteristics configuration of the present invention illustrated in FIGS. 3 and 4A are also provided in the image processing apparatus main control unit 108, and flowcharts to be described with FIGS. 2 and 4B are performed by the CPU of the image processing apparatus main control unit 108. Also, a lookup table described with FIG. 2 or 7 is preliminarily stored in the ROM inside the image processing apparatus main control unit 108 for each print medium type and for each print mode. An image processing apparatus interface (I/F) 109 transceives a data signal with the printing apparatus 1. An externally connecting interface (I/F) 113 transceives image data and the like with the image supply device 3 externally connected. A display unit 110 displays various pieces of information to a user, and can be applied with a display such as an LCD. An operation unit 111 is a mechanism for a user to perform a command operation, and can be applied with, for example, a keyboard and a mouse. A system bus 112 connects the image processing apparatus main control unit 108 and the respective functions to each other.

FIG. 2 is a flowchart for explaining an image data process performed by the image processing apparatus main control unit 108. This process is performed by the CPU provided in the image processing apparatus main control unit 108 in accordance with a program stored in the ROM. In FIG. 2, when image data on a target pixel is inputted from the image supply device 3 (Step S200), the image processing apparatus main control unit 108 first makes a color correction in Step S201. The image data received by the image processing apparatus 2 from the image supply device 3 includes pieces of R (red), G (green), and B (blue) 8-bit luminance data for expressing standardized color space such as sRGB. In Step S201, these pieces of luminance data are converted to pieces of RGB 12-bit luminance data corresponding to color space specific to the printing apparatus. As a method for converting a signal value, a publicly known method such as a method that refers to a lookup table (LUT) preliminarily stored in the ROM or the like can be employed.

In Step S202, the image processing apparatus main control unit 108 decomposes the converted pieces of RGB data to pieces of 16-bit gradation data (density data) respectively for C (cyan), M (magenta), Y (yellow) and K (black) that correspond the ink colors of the printing apparatus. In this step, a 16-bit gray image is generated for each of four channels (four colors). In the ink color decomposition process as well, a lookup table (LUT) preliminarily stored in the ROM or the like can be referred to as in the color correction process.

In Step S203, the image processing apparatus main control unit 108 performs a predetermined quantization process on the pieces of 16-bit gradation data respectively corresponding to the ink colors to convert to pieces of several bit quantized data. For example, in the case of quantization into 3-level data, the pieces of 16-bit gradation data are converted to pieces of 2-bit data each corresponding to any of Level 0 to Level 2. The quantization process will be described later in detail.

In subsequent Step S204, the image processing apparatus main control unit 108 performs an index expansion process. Specifically, from among multiple dot arrangement patterns where the number of dots to be printed in each pixel and a corresponding position are determined, one dot arrangement pattern is related to a level obtained in Step S203 to be selected. Then, resultant pieces of dot data are outputted as pieces of binary data (Step S205). This completes the image data process.

FIG. 3 is a block diagram for explaining the details of the quantization process performed in Step S203 of FIG. 2. The quantization process in the present invention is performed in accordance with a dither method. In the quantization process in the present embodiment, an input value is first processed, then a threshold value is processed, and finally the quantization process is performed. These series of processes are parallel performed on a color basis (on a channel basis). In the following, each of the processes will be described in detail with reference to FIG. 3.

An image data acquisition unit 301 acquires pieces of 16-bit gradation data indicating the density of each pixel. It is assumed that the image data acquisition unit 301 in the present embodiment can receive signals having at most 16 bits for eight colors. The diagram illustrates a state where the pieces of 16-bit data respectively on first to fourth colors are inputted.

A noise addition process unit 302 adds predetermined noise to the pieces of 16-bit gradation data. By adding the noise, even in the case where pieces of gradation data of the same level are continuously inputted, a state where the same patterns are continuously arranged can be avoided to reduce a stripe, texture, and the like. The noise addition process unit 302 multiplies a predetermined random table, fixed intensity, and variable intensity corresponding to an input value, and thereby noise is generated for each pixel and added to the input value. Note that the random table is a table adapted to set the polarity of noise, and sets a plus, zero, or a minus for each pixel position. The random table in the present embodiment can have at most eight faces, and the size of each table can be arbitrarily set. The fixed intensity indicates the intensity of a noise amount, and the magnitude of the intensity determines whether noise is large or small. In the present embodiment, by setting a random table or fixed intensity optimum for each print mode depending on the graininess of, the degrees of stripe and texture of an image, and the like, a noise amount can be appropriately adjusted.

A normalization process unit 303 relates a gradation value of each pixel represented by 16 bits to a level value enabling the index expansion in Step S204, and then normalizes each level range to 12 bits. In the following, a specific description will be given. In the case where the index expansion process in Step S204 is a process corresponding to n values from Level 0 to Level (n−1), the normalization process unit 303 equally divides 65535 gradations represented by 16 bits into (n−1). Further, a range corresponding to each level is normalized to 12 bits (4096 gradations). This makes it possible to, for each pixel, obtain pieces of 12-bit data related to any of Level 0 to Level (n−1).

For example, in the case where the index expansion process corresponds to three values of Level 0, Level 1, and Level 2, the normalization process unit 303 equally divides the 65535 gradations represented by 16 bits into two. Then, the normalization process unit 303 normalizes respective ranges corresponding to gradation values of 0 to 32767 and gradation values of 32768 to 65535 to 12 bits (0 to 4095 gradations). For a pixel corresponding to any of the input gradation values of 0 to 32767 as the first range, Level 0 or Level 1 is outputted by the subsequent quantization process, whereas for a pixel corresponding to any of the input gradation values of 32768 to 65535 as the second range, Level 1 or Level 2 is outputted by the subsequent quantization process. In accordance with the above-described control, even in the case where a quantization number (n) is any number, the subsequent quantization process can be performed in the same manner.

The processes in the image data acquisition unit 301 to the normalization process unit 303 described above are parallel performed on the pieces of gradation data on the respective colors. That is, in the present embodiment, the pieces of 12-bit data on black, cyan, magenta, and yellow are generated, and inputted to a dither process unit 311.

In the dither process unit 311, 12-bit data to be quantized (processing target data) is directly transmitted to a quantization process unit 306. On the other hand, pieces of 12-bit data on colors other than the processing target data are inputted to a color correlating process unit 304 as pieces of reference data. The color correlating process unit 304 performs a predetermined process on a threshold value acquired by a threshold value acquisition unit 305 on the basis of the pieces of reference data to determine a final threshold value, and transmits the final threshold value to the quantization process unit 306. The quantization process unit 306 compares the processing target data with the threshold value inputted from the color correlating process unit 304, and thereby determines printing (1) or non-printing (0) of dot.

The threshold value acquisition unit 305 acquires a threshold value corresponding to a pixel position associated with the processing target data from a dither pattern 310 stored in a memory such as the ROM. In the present embodiment, the dither pattern 310 is a threshold value matrix formed by arraying threshold values of 0 to 4095 so as to have blue noise characteristics, i.e., a threshold value matrix formed so as to keep power in a lower frequency range lower than power in a higher frequency range. In addition, the dither pattern 310 can provide various sizes and shapes such as 512×512 pixels, 256×256 pixels, and 512× 256 pixels. That is, the memory preliminarily stores multiple threshold value matrices having different sizes and shapes as described, and the threshold value acquisition unit 305 selects a threshold value matrix corresponding to a print mode from among the multiple threshold value matrices. Then, from among multiple threshold values arrayed in the selected threshold value matrix, the threshold value acquisition unit 305 provides a threshold value corresponding to the pixel position (x, y) associated with the processing target data to the color correlating process unit.

In the following, a method for determining a threshold value in the color correlating process unit 304 will be described in detail.

FIGS. 4A and 4B are a block diagram and a flowchart, respectively, for explaining the configuration and steps of a process in the color correlating process unit 304. The color correlating process unit 304 sets the pieces of 12-bit data corresponding to the colors other than the processing target data as the pieces of reference data, uses these pieces of reference data to perform the predetermined process on the threshold value acquired by the threshold value acquisition unit 305, and calculates the threshold value for quantizing the processing target data. For example, in the case where the processing target data is 12-bit data on black, the pieces of reference data are pieces of 12-bit data on cyan, magenta, and yellow. In FIG. 4A, the processing target data is denoted by In1(x, y), and the pieces of reference data are denoted by In2(x, y), In3(x, y), and In4(x, y). Here, (x, y) represents the pixel position, which serves as a coordinate parameter for the threshold value acquisition unit 305 to select the threshold value corresponding to the pixel position associated with the processing target data from the threshold value matrix.

Referring to FIG. 4A, the pieces of reference data In2(x, y) to In4(x, y) inputted to the color correlating process unit 304 are first inputted to a threshold value offset amount calculation unit 308 (Step S401). In doing so, the threshold value offset amount calculation unit 308 uses these pieces of reference data to calculate a threshold value offset Ofs_1(x, y) for the processing target data In1(x, y) (Step S402). In the present embodiment, the threshold value offset value Ofs_1 (x, y) is calculated in accordance with Expression 2.

$$Ofs\_1(x,y) = \Sigma i[Ini(x,y)] \quad \text{(Expression 2)}$$

Here, i represents a parameter individually indicating, among the pieces of reference data In2(x, y) to In4(x, y), one or more pieces of reference data (hereinafter referred to as pieces of actual reference data) used to obtain the threshold value for the processing target data In1. The number and type of such pieces of actual reference data are predesignated for each processing target data.

In the present embodiment, it is assumed that in the case where the processing target data is In1(x, y) (first color), a null is the actual reference data, and in the case where the processing target data is In2(x, y) (second color), In1(x, y) is the actual reference data. It is also assumed that in the case where the processing target data is In3(x, y), In1(x, y) and In2(x, y) are the pieces of actual reference data, and in the case where the processing target data is In4(x, y), In1(x, y), In2(x, y), and In3(x, y) are the pieces of actual reference data. Accordingly, offsets Ofs_1(x, y) to Ofs_4(x, y) for the respective pieces of processing target data In1(x, y) to In4(x, y) can be expressed as follows in accordance with Expression 2.

$$Ofs\_1(x, y) = \Sigma i[In(x, y)] \quad \text{(Expression 2-1)}$$
$$= 0$$

$$Ofs\_2(x, y) = \Sigma i[In(x, y)] \quad \text{(Expression 2-2)}$$
$$= In1(x, y)$$

$$Ofs\_3(x, y) = \Sigma i[In(x, y)] \quad \text{(Expression 2-3)}$$
$$= In1(x, y) + In2(x, y)$$

$$Ofs\_4(x, y) = \Sigma i[In(x, y)] \quad \text{(Expression 2-4)}$$
$$= In1(x, y) + In2(x, y) + In3(x, y)$$

As described, when the threshold value offset values Ofs_1(x, y) to Ofs_4(x, y) are calculated, these values are inputted to a threshold value offset unit 309. On the other hand, the threshold value offset unit 309 acquires a threshold value Dth corresponding to the coordinates (x, y) of processing target data In(x, y) from the threshold value acquisition unit 305 (Step S403).

In Step S404, the threshold value offset unit 309 subtracts the threshold value offset value Ofs_1(x, y) inputted from the threshold value offset amount calculation unit 308 from the threshold value Dth(x, y) inputted from the threshold value acquisition unit 305 to obtain a quantization threshold value Dth'(x, y).

$$Dth'(x,y) = Dth(x,y) - Ofs\_1(x,y) \quad \text{(Expression 3)}$$

In so doing, in the case where Dth'(x, y) takes a minus value, Dth_max (the maximum value among threshold values in the dither pattern) is added, and a resultant value is treated as the quantization threshold value Dth'(x, y). In doing so, the quantization threshold value Dth' is constantly Dth'=0 to Dth_max.

That is, in the case where Dth'(x, y)<0, the following expression holds:

$$Dth'(x,y) = Dth'(x,y) + Dth\_max \quad \text{(Expression 4)}$$

When the quantization threshold value Dth'(x, y) is obtained in accordance with Expression 3 or 4, the quantization process unit 306 compares the processing target data In1(x, y) and the quantization threshold value Dth'(x, y) with each other to determine dot printing (1) or non-printing (0) for the pixel position (x, y). This completes the processing steps.

After that, as described with the flowchart in FIG. 3, quantized data Out1(x, y) represented by several bits is subjected to the index expansion process, and a dot pattern to be printed at the pixel position (x, y) is determined. In so doing, the number of dots to be printed at the pixel position (x, y) is set to be a number corresponding to a level value, such as one dot when the level value is 1, or two dots when the level value is 2.

FIG. 5 is a diagram illustrating ranges of threshold values determined as printing (1) among the multiple threshold values 0 to Dth_max arranged in the dither pattern 310 when the first to fourth pieces of multi-valued data (In1 to In4) are inputted respectively for the first to fourth colors. The horizontal axis represents a threshold value 0 to 4094, and "1710" represents Dth_max (the maximum value among the threshold values in the dither pattern). Each thick line indicates a threshold value range where dots are arranged. In the present embodiment, the offset of the first color is Ofs_1=0 from Expression 2-1. Accordingly, pixel positions each corresponding to any of threshold values of 0 to In1(1702 to 1703) among 0 to Dth_max are set to printing (1).

The offset of the second color is Ofs_2=In1 from Expression 2-2. Accordingly, as a result of quantization using the threshold value Dth' obtained in accordance with Expressions 3 and 4, threshold values of In1 to In1+In2 (1705 to 1706) among the threshold values 0 to Dth_max arrayed in the dither pattern 310 are set to printing (1).

The offset of the third color is Ofs_3=In1+In2 from Expression 2-3. Accordingly, as a result of quantization using the threshold value Dth' obtained in accordance with Expressions 3 and 4, In1+In2 to In1+In2+In3 (1708 to 1709) among the threshold values 0 to Dth_max arrayed in the dither pattern 310 are set to printing (1). Note that in this example, (In1+In2+In3) is assumed to exceed Dth_max. In this case, a range exceeding Dth_max is treated as follows. That is, a range corresponding to the remainder obtained by dividing (In1+In2+In3) by Dth_max, i.e., threshold values of 0 to In1+In2+In3−Dth_max are set to printing (1). In other words, In1+In2 to Dth_max (1708 to 1710) and 0 to In1+In2+In3−Dth_max (1707 to 1711) are threshold value ranges determined as printing (1).

The offset of the fourth color is Ofs_4=In1+In2+In3 from Expression 2-4. Accordingly, as a result of quantization using the threshold value Dth' obtained in accordance with Expressions 3 and 4, In1+In2+In3 to In1+In2+In3+In4 among the threshold values 0 to Dth_max arrayed in the dither pattern 310 are threshold values set to printing (1). Note that in this example, the entire range of In1+In2+In3 to In1+In2+In3+In4 exceeds Dth_max. Therefore, a range corresponding to the remainder obtained by dividing (In1+In2+In3+In4) by Dth_max, i.e., threshold values of In1+In2+In3−Dth_max to In1+In2+In3+In4−Dth_max (1713 to 1714) are set to printing (1).

As described, in the present embodiment, despite using the common threshold value Dth, the quantization threshold values Dth' specific to the respective colors are obtained by setting the mutual input values as the offset values. Further, by using the newly obtained quantization threshold values Dth' for the quantization process, dots can be arranged such that a dot print pattern in which the multiple colors are mixed has blue noise characteristics. Meanwhile, as has been described, a dither pattern used in the present embodiment is a threshold value matrix having blue noise characteristics. That is, when arranging dots sequentially from a pixel having the smallest threshold value, threshold values are arranged so as to obtain preferable dispersibility in any gradation. For this reason, a dot pattern where dots are arranged sequentially from a pixel having a threshold value of zero, like a dot pattern of the first color, has blue noise characteristics, resulting in preferable dispersibility. Also, in the case of the sum of the first to fourth colors as well, a dot pattern where dots are arranged sequentially from a pixel having a threshold value of zero is consequently obtained to achieve blue noise characteristics, resulting in preferable dispersibility. In this way, in a case representing a density of middle gradation, the benefit from the blue noise characteristics is received. Regarding other gradation, the same may be said.

However, when focusing on a dot pattern of a single color, i.e., each of the second to fourth colors, a dot is not arranged in a pixel having a low threshold value, but dots are arranged sequentially from a somewhat high threshold value.

Figure 13:
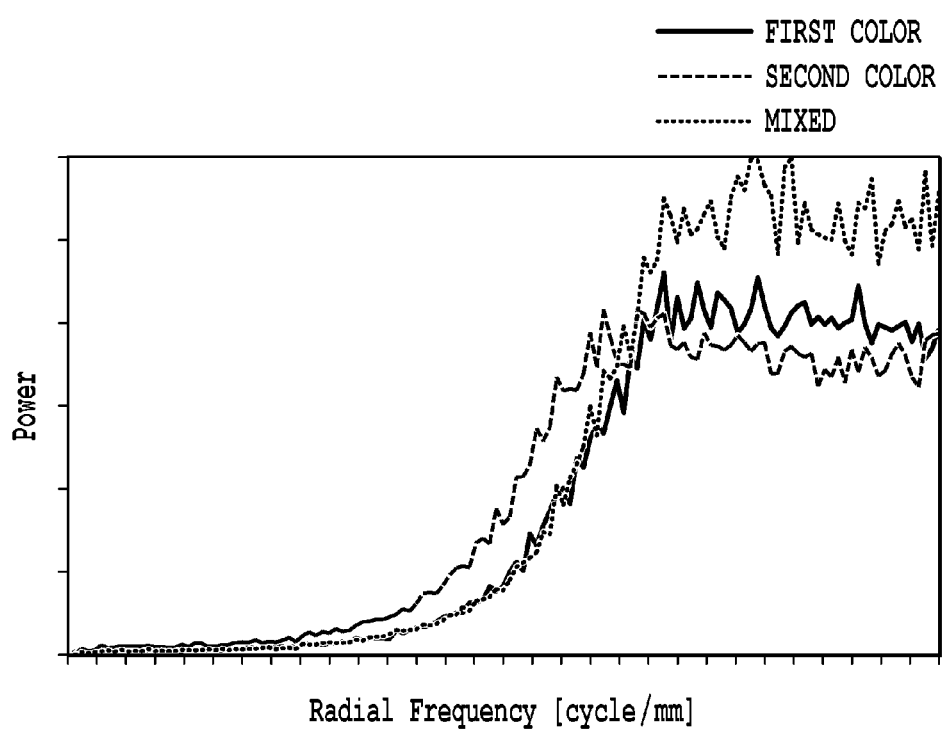
FIG. 13 is a diagram comparing the frequency characteristics of a first single color, those of a second single color, and those of mixed color with one another.

FIG. 13 is a diagram comparing the frequency characteristics of a dot pattern of each of the first and the second colors, and the frequency characteristics of a dot pattern of a mixed color of the first and second colors as described above. Any of the dot patterns has, to some extent, the blue noise characteristics including a suppressed low frequency component, a rapid rise, and a flat high frequency component. However, in the case of the single color dot pattern of the second color, as compared with the single color dot pattern of the first color, and the mixed color dot pattern of the first and second colors, the blue noise characteristics is lost to some extent because of an insufficiently suppressed low frequency component and a gentle rise. For this reason, the single color dot pattern of the second color has low dispersibility as compared with the single color dot pattern of the first color, and graininess is likely to be perceived.

That is, in the case of each of the second to fourth colors, corresponding frequency characteristics are like those illustrated in FIG. 13, which do not have sufficiently blue noise characteristics, and as compared with the first color, graininess is easily perceived.

Accordingly, in order to suppress the graininess of an entire image, if possible, it is desirable to set a color material making each dot conspicuous for the first color not involving threshold value offsetting. On the other hand, as has been described using FIGS. 14A to 14D, the conspicuousness of each dot depends on the order of inks to be applied to a print medium S. For this reason, from the perspective of the configuration of the printing apparatus, an ink to be first applied to a same area of a print medium is set for the first color.

Note that even among the second to fourth colors, the difference in dot conspicuousness appears depending on application order. In the following, the case of sequentially applying inks of three colors will be described.

FIGS. 17A and 17B are schematic diagrams for explaining the order of three types of color materials applied to a print medium and a permeation state. FIG. 17A illustrates a state where a precedent ink 530 containing a first color material 550, an intermediate ink 540 containing a second color material 560, and a succeeding ink 570 containing a third color material 580 are applied to substantially the same position of the print medium S in this order. As with the description for FIGS. 14A to 14D, inside the print medium S, multiple absorbents 520 are arranged to form an absorbent layer.

FIG. 17A illustrates a state immediately before the precedent ink 530 contact a paper surface 510 of the print medium S. The precedent ink 530 first contacts the print medium S, and permeates through the print medium from the paper surface. Then, the intermediate ink 540 and the succeeding ink 570 sequentially contact the print medium and permeate inside.

FIG. 17B illustrates a state where the multiple inks have permeated and the color materials adsorb. As described with FIGS. 14A to 14D, first, the color material 550 of the precedent ink 530 adsorbs to adsorbents 520 positioned near the paper surface 510. Then, the color material 560 of the intermediate ink 540 passes over the absorbent 520 to which the color material 550 has already adsorbed, and adsorbs to nearby adsorbents 520. Further, the color material 580 of the succeeding ink 570 passes over the adsorbents 520 to which the color material 550 of the precedent ink 530 and the color material 560 of the intermediate ink 540 have already adsorbed, and adsorbs to nearby adsorbents.

Now, when focusing on the color material 560 of the intermediate ink 540 and the color material 580 of the succeeding ink 570, the color material 580 of the succeeding ink 570 permeates more deeply than the color material 560 of the intermediate ink 540, and is therefore weaker in color chromogenic, and as a result, dots are inconspicuous. For this reason, in order to reduce the graininess of an entire image, it is preferable to make the dispersibility of intermediate ink 540 dots, which are more conspicuous, higher than the dispersibility of succeeding ink 570 dots, which are more inconspicuous.

That is, regardless of an ink to be first applied to a print medium, the dispersibility of an ink to be relatively precedently applied is preferably set to be higher than that of an ink to be applied succeedingly to the relatively precedent ink. In particular, in the case where print data on an ink to be printed precedently to an intermediate ink is low gradation data, i.e., in the case where such an ink is hardly applied, an ink of which dots are most conspicuous on a print medium is the intermediate ink, and the dispersibility of the intermediate ink significantly affects the graininess of an entire image.

When considering such a situation, it is effective to make the order of the first to fourth colors in the above-described quantization process coincide with ink application order. That is, in the example illustrated in FIGS. 17A and 17B, it is preferable to set the precedent ink 530 for the first color not referring to any other color, set the intermediate ink 540 for the second color referring to only a value related to the precedent ink 530, and set the succeeding ink 570 for the third color referring to values related to the precedent ink 530 and the intermediate ink 540. In doing so, the dispersibility of an entire image can be enhanced to prevent an increase in graininess at the time of using multiple colors.

Figure 6A:
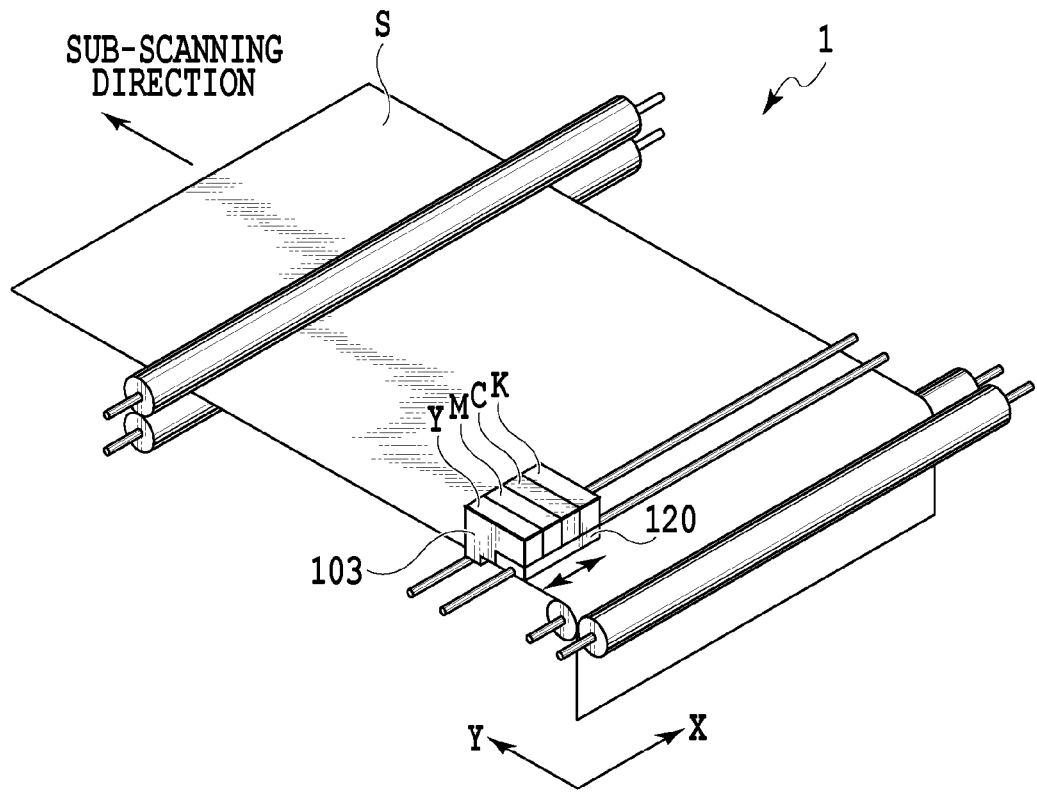
FIGS. 6A and 6B are configuration diagrams of an inkjet printing apparatus and a print head.
Figure 6B:
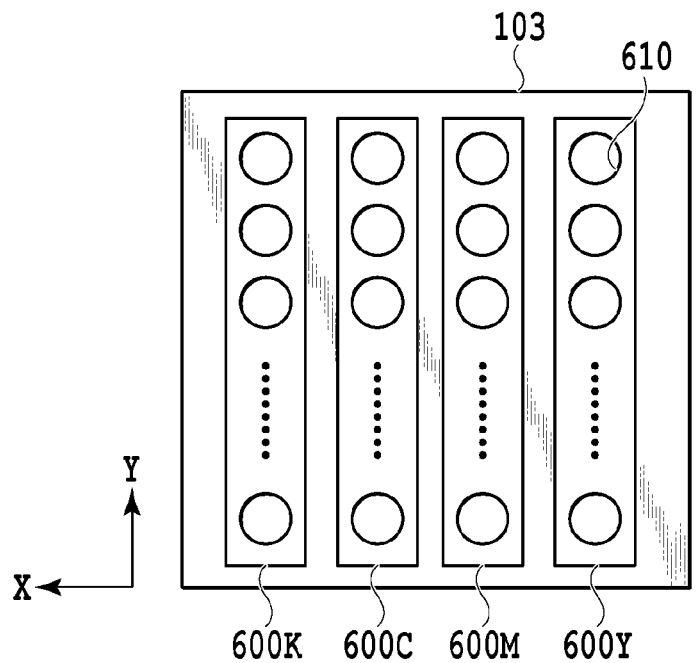

FIGS. 6A and 6B are configuration diagrams of the inkjet printing apparatus and the print head used in the present embodiment. Referring to FIG. 6A, the inkjet printing apparatus employed in the present embodiment is a serial type color inkjet printing apparatus. The inkjet printing apparatus prints an image on a print medium S stepwise by performing a print scan that in an X direction in the diagram, moves a carriage 120 mounting the print head 103 adapted to eject the inks, and a conveyance action that conveys a print medium S in a Y direction by a distance corresponding to a print width of the print scan, intermittently.

FIG. 6B is diagram of the print head 103 as observed from an ejection port surface side. On the print head 103, an ejection port array 600K adapted to eject the black ink, an ejection port array 600C adapted to eject the cyan ink, an ejection port array 600M adapted to eject the magenta ink, and the ejection port array 600Y adapted to eject the yellow ink are parallel arranged in the main scanning direction (X direction). In each of the ejection port arrays, ejection ports 610 adapted to eject a corresponding ink as droplets are arrayed in the Y direction at pitches of 1200 dpi.

On the basis of such a configuration, the print head 103 performs a print action in accordance with print data during the movement of the carriage 120 in the X direction. As a result, the same area of the print medium S is applied with the inks sequentially from the black ink positioned constantly ahead in the main scanning direction, i.e., in the order of black→cyan→magenta→yellow. For this reason, in the present embodiment, black is set as the first color (first colored ink) in the quantization process. In addition, cyan, magenta, and yellow are set as the second, third, and fourth colors (colored inks), respectively. In doing so, the blue noise characteristics of black dots that are applied precedently and more conspicuously develop color can be more enhanced than those of the other inks applied succeedingly. As a result, in a mixed image using the four colors of black, cyan, magenta, and yellow, in either case of a dot pattern of each color material or the sum of dot patterns of the multiple color materials, a high-quality color image of which the graininess is not easily perceived can be outputted.

In addition, the ink colors used in the printing apparatus are not limited to the four colors of CMYK. A color that is of the same type but has different density, such as LC (light cyan), LM (light magenta), or Gray (gray), or a particular color such as R (red), G (green), or B (blue) can also be used. In the case of such a printing apparatus, it is only necessary to prepare ejection port arrays corresponding to ink colors, and perform a process as described above with a plane number corresponding to the ink colors used. In either case, by making the dispersibility of print data on an ink color to be precedently printed better than on an ink color to be succeedingly printed, an increase in graininess at the time of using multiple colors can be prevented. The embodiment described above is especially suitable for a case where a multi-valued data of an ink to be precedently applied and a multi-valued data of an ink to be succeedingly applied represent a middle gradation density together. Here, the middle gradation density means a gradation where dot overlapping is produced to some extent, such as a case, for example, where values of both of multi-valued data In1 and In2 are between 15% and 60% of maximum value of the multi-valued data In. In such a case, dots printed based on multi-valued data In1 disperse more desirable than dots printed based on multi-valued data In2. Especially, in a case where values of both of multi-valued data In1 and In2 are between 25% and 50% of maximum value of the multi-valued data In, the dispersibility of dot becomes particularly important in a situation where dots of two ink colors are overlapped, and then the this embodiment becomes particularly useful. The effect described above can be provided even if multi-valued data In1 are not uniform in an area of the print medium corresponding to a plurality of pixels both in the X direction and the Y direction, and of course even if multi-valued data In2 are also not uniform in the area.

Second Embodiment

In the present embodiment as well, the inkjet printing system is used to perform the quantization process described with FIGS. 1 to 5, and the inkjet printing apparatus illustrated in FIGS. 6A and 6B is used. Note that in the first embodiment, one-way printing that ejects inks only during the movement of the carriage in the +X direction is performed; however, in the present embodiment, two-way printing that ejects inks during the movement of the carriage in both +X and −X directions is performed (see FIG. 6A). That is, by sequentially repeating a print scan in the +X direction→a conveyance action in the Y direction→a print scan in the −X direction→a conveyance action in the Y direction, an image is printed on a print medium S.

In this case, on the print medium S, a first area where the inks are applied in the order of black→cyan→magenta→yellow, and a second area where the inks are applied in the order of yellow→magenta→cyan→black are arranged alternately in the Y direction. Further, in the first area, black dots are positioned on the outermost surface, whereas in the second area, yellow dots are positioned on the outermost surface.

For this reason, in the color correlating process unit 304 in the present embodiment, inks respectively set as first to fourth colors are made different between the first area and the second area. Specifically, in the first area where the inks are applied in the order of black cyan magenta yellow, the graininess of black dots is most conspicuous, and therefore black is set as the first color for the quantization process. On the other hand, in the second area where the inks are applied in the order of yellow→magenta→cyan→black, the graininess of yellow dots is most conspicuous, and therefore yellow is set as the first color for the quantization process. That is, in the present embodiment, the quantization process is performed differently between the first area and the second area.

In addition, between the first and the second areas between which ink application order to the same area is different, as has been described with FIGS. 14A to 14D, the stacking order of the respective color materials near the surface layer of a print medium is opposite, and the color chromogenic property also tends to be different. Accordingly, in the present embodiment, the color correction process and the ink decomposition process described with FIG. 2 are also performed independently between the first area and the second area.

FIG. 7 is a flowchart for explaining an image data process performed by the image processing apparatus main control unit 108 in the present embodiment. This process is also performed by the CPU provided in the image processing apparatus main control unit 108 in accordance with a program and lookup tables stored in the ROM as in the first embodiment.

In FIG. 7, when image data on a target pixel is inputted from the image supply device 3 (Step S600), the image processing apparatus main control unit 108 first acquires image data corresponding one band printable during one print scan in Step S601. Then, in subsequent Step S602, the image processing apparatus main control unit 108 determines whether the one band image data will be printed during a print scan in a forward direction (+X direction) or a print scan in a backward direction (−X direction).

In Step S602, in the case where it is determined that the one band image data will be printed during the print scan in the forward direction, the process proceeds to Step S603, a color correction A dedicated to the forward scan is performed on the one band image data. Specifically, with reference to a lookup table (LUT) that is dedicated to the forward scan and preliminarily stored in the ROM or the like, pieces of RGB 8-bit luminance data are converted to pieces of RGB 12-bit luminance data. Then, the process proceeds to Step S604, where an ink color decomposition process A dedicated to the forward scan is performed. Specifically, with reference to a lookup table (LUT) that is dedicated to the forward scan and preliminarily stored in the ROM or the like, the pieces of RGB 12-bit luminance data are converted to pieces of CMYK 16-bit density data.

Further, the process proceeds to Step S605, where a quantization process A dedicated to the forward scan is performed. Specifically, referring to FIGS. 4A and 4B again, after black has been set as the first color (In1), and each of cyan, magenta, and yellow has been set as the second to fourth colors (In2 to In4) respectively, the same quantization process as that in the first embodiment is performed using a threshold value matrix acquired by the threshold value acquisition unit 305. In doing so, pieces of several bit quantized data on the respective colors are obtained.

On the other hand, in Step S602, in the case where it is determined that the one band image data will be printed during the print scan in the backward direction, the image processing apparatus main control unit 108 proceeds with the process to Step S606, where a color correction B dedicated to the backward scan is performed. Specifically, with reference to a lookup table (LUT) that is dedicated to the backward scan and preliminarily stored in the ROM or the like, pieces of RGB 8-bit luminance data are converted to pieces of RGB 12-bit luminance data. Then, the process proceeds to Step S607, where an ink color decomposition process B dedicated to the backward scan is performed. Specifically, with reference to a lookup table that is dedicated to the backward scan and preliminarily stored in the ROM or the like, the pieces of RGB 12-bit luminance data are converted to pieces of CMYK 16-bit density data.

Further, the process proceeds to Step S608, where a quantization process B dedicated to the backward scan is performed. Specifically, after yellow has been set as the first color (In1), and each of magenta, cyan, and black has been set as the second to fourth colors (In2 to In4) respectively, the same dither process as that in the first embodiment is performed using the same threshold value matrix as that in Step S605. In doing so, pieces of several bit quantized data on the respective ink colors are obtained.

In subsequent Step S609, the image processing apparatus main control unit 108 performs the same index expansion process as that in the first embodiment. That is, from among predetermined multiple dot arrangement patterns, one dot arrangement pattern is related to a level obtained in Step S605 or S608 to be selected. Then, resultant pieces of dot data are outputted to the printing apparatus 1 as pieces of binary data (Step S610).

In Step S611, the image processing apparatus main control unit 108 determines whether or not a current process is a process for the final band. In the case where it is determined that a band to be processed still remains, the process returns to Step S601 in order to process image data corresponding to the next band. On the other hand, it is determined that a band to be processed does not remain, this image data process is ended.

According to the present embodiment described above, even in the case of performing the bidirectional (two-way) printing, the quantization processes corresponding to the respective scanning directions can be performed. That is, for each of the forward scan and the backward scan, it is possible to set an ink of which dots are most conspicuous for the first color not involving threshold value offsetting, and then perform the dither process using a threshold value matrix having blue noise characteristics. As a result, in the case of the bidirectional printing as well, a high-quality color image of which the graininess is not easily perceived can be outputted as in the first embodiment.

Note that in the above, the lookup table for the forward scan and that for the backward scan are prepared for each of the color correction process and the ink decomposition process, and the index expansion process is performed using the common dot arrangement pattern. However, if some difference occurs between the forward scan and the backward scan even in the case of using the same dot arrangement pattern, an independent dot arrangement pattern may be prepared for each of the scans to compensate the difference.

Also, in the above-described flowchart, the pieces of binary data after the process are outputted on a one-band basis; however, it may be configured to complete an image process corresponding to one page, and then output pieces of binary data corresponding to the one page collectively to the printing apparatus 1.

Third Embodiment

In the present embodiment as well, the inkjet printing system is used to perform the quantization process described with FIGS. 1 to 5, and the inkjet printing apparatus illustrated in FIG. 6A is used. Note, however, that the ejection port arrays of the print head 103 are configured differently from any of the above-described embodiments.

Figure 8:
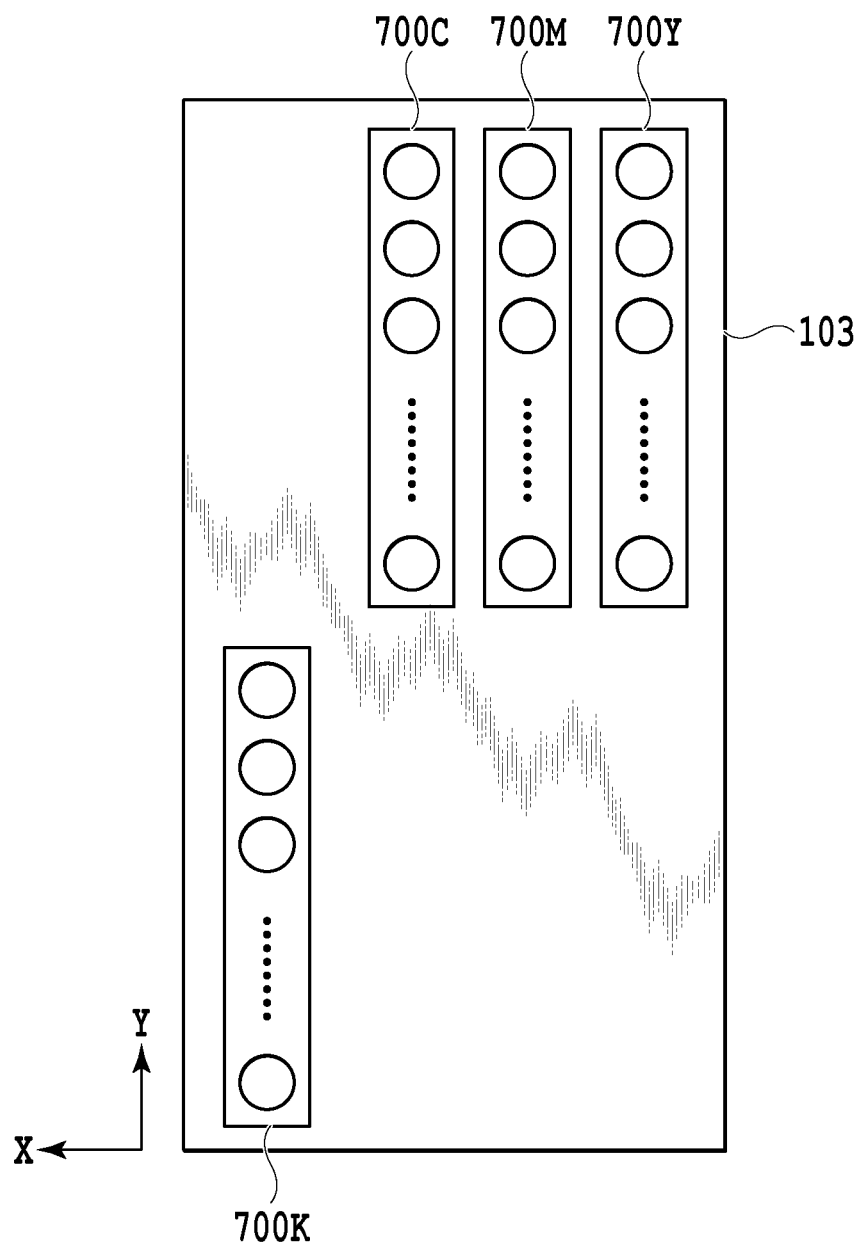
FIG. 8 is a configuration diagram of a print head used in a third embodiment.

FIG. 8 is a diagram of the print head 103 used in the present embodiment as observed from an ejection port surface side. In the present embodiment, a black ejection port array 700K is arranged in an upstream location in the Y direction (conveyance direction) with respect to a cyan ejection port array 700C, magenta ejection port array 700M, and yellow ejection port array 700Y. When performing a print scan in the X direction using the print head 103 having such a configuration, regardless of whether one-way printing or two-way printing is performed, a black ink is constantly first applied to the same area of a print medium S. For this reason, in the present embodiment, black is set as the first color for the quantization process. Also, each of cyan, magenta, and yellow is set as any of the second to fourth colors. In doing so, the blue noise characteristics of first applied black dots each of which is conspicuous can be more enhanced than those of the other ink dots applied later. As a result, in a mixed image using the four colors of black, cyan, magenta, and yellow, in either case of a dot pattern of each color material or the sum of dot patterns of the multiple color materials, a high-quality image of which the graininess is not easily perceived can be outputted.

In this configuration, the K ink is constantly applied precedently, and then the CMY inks are applied. For this reason, when bi-directionally moving the carriage for printing to improve throughput as well, constantly the application order of the K ink and the other inks is unchanged, and the difference in print color as referred to in the second embodiment does not occur.

Fourth Embodiment

In any of the above-described embodiments, the inkjet printing system using the four colors of cyan, magenta, yellow, and black is described. On the other hand, in the present embodiment, a configuration additionally using light cyan and light magenta will be described. Further, a quantization process that actively reduces the graininess of an ink applied precedently is performed as in any of the above-described embodiment. In addition, in the present embodiment as well, the inkjet printing system is used to perform the quantization process described with FIGS. 1 to 5, and the inkjet printing apparatus illustrated in FIG. 6A is used.

Figure 9:
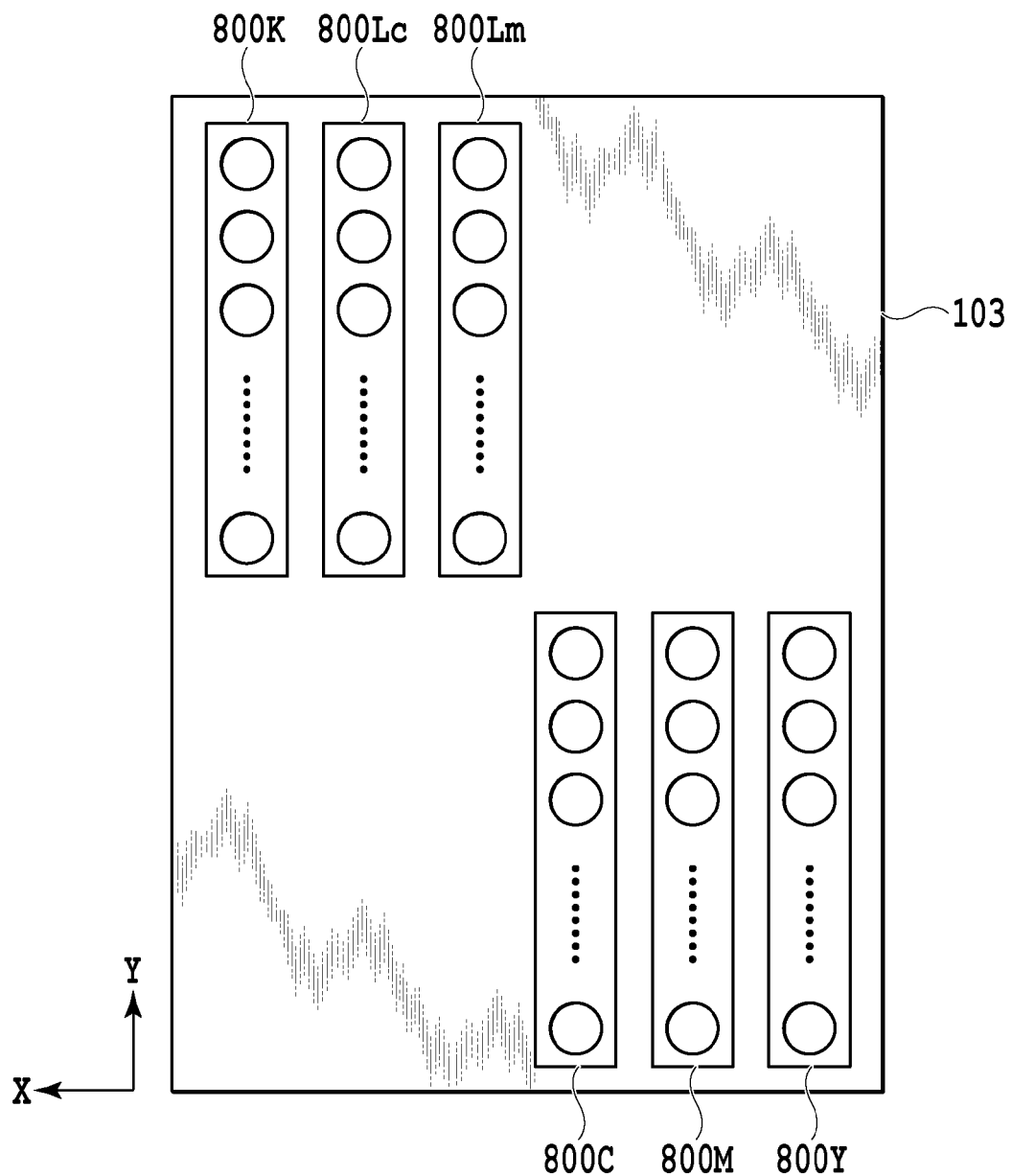
FIG. 9 is a configuration diagram of a print head used in a fourth embodiment.
Figures 10A, 10B, 10C:
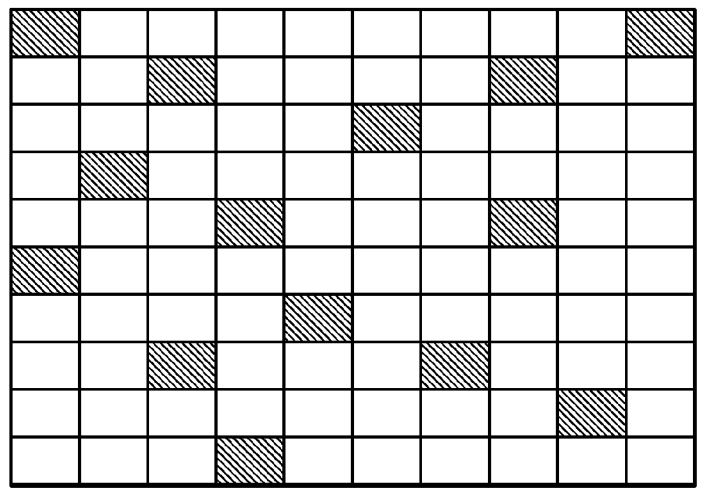
FIGS. 10A to 10C are explanatory diagrams of a dither process using a threshold value matrix.
Figure 11A:
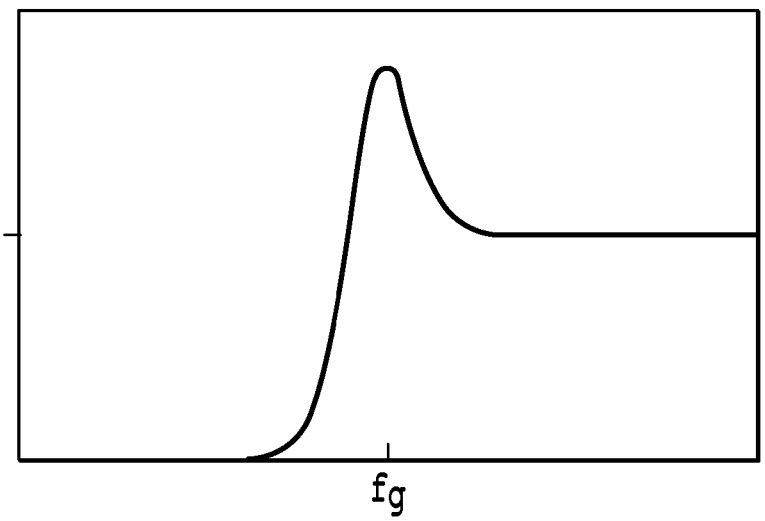
FIGS. 11A and 11B are comparative diagrams between blue noise characteristics and visual characteristics.
Figure 11B:
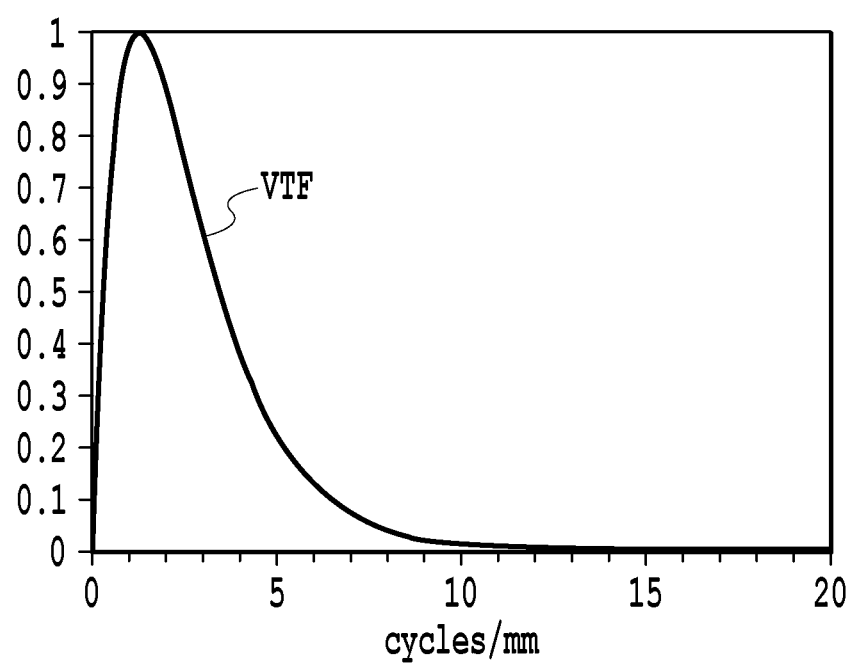
Figure 12:
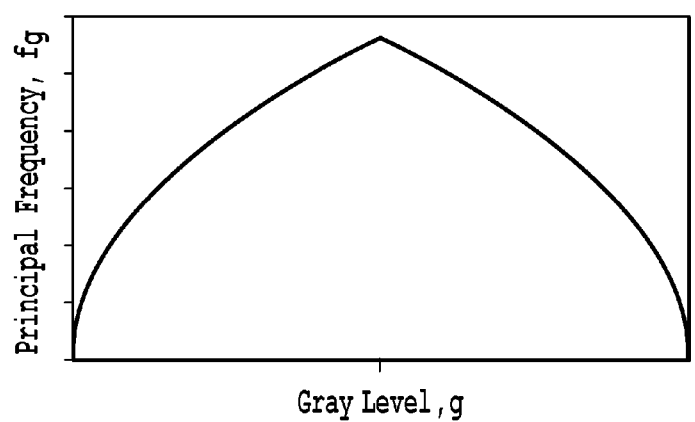
FIG. 12 is a diagram illustrating the relationship between a gradation value and a principal frequency.

FIG. 9 is a diagram of a print head 103 used in the present embodiment as observed from an ejection port surface side. A cyan ejection port array 800C, magenta ejection port array 800M, and yellow ejection port array 800Y are arranged upstream of a black ejection port array 800K, light cyan ejection port array 800Lc, and light magenta ejection port array 800Lm in the Y direction (conveyance direction). When performing a print scan using the print head 103 having such a configuration, the cyan, magenta, and yellow inks are constantly applied to the same area of a print medium S precedently to the black, light cyan, and light magenta inks in either case of one-way printing or two-way printing. When doing so, in the present embodiment, cyan and light cyan, magenta and light magenta, and black and yellow are respectively combined as sets, and cyan, magenta, and yellow are set as the first colors of the respective sets. Also, light cyan, light magenta, and black are set as the second colors of the respective sets. In doing so, the dispersibility of cyan, magenta, and yellow dots that are applied precedently to the same area of the print medium and more noticeably develop color can be more enhanced than that of light cyan, light magenta, and black dots succeedingly applied.

Note that how to make the sets and the number of sets are not limited to those described above. For example, it may be configured that after cyan, light cyan, and light magenta have been combined as one set, cyan is set as the first color, and each of light cyan and light magenta is set as the second or third colors.

Further, ink types are also not limited to those in the above-described embodiment. It may be configured to further add a particular color ink such as a red ink, green ink, or blue ink. Needless to say, an ink containing a color material of which the concentration is different can also be further added, such as a gray ink in addition to the light cyan and light magenta inks. The above-described effect of the present invention can be obtained as long as an ink relatively precedently printed is set to the first color, and an ink succeedingly printed is set to the second or subsequent color in either case of the same print scan as in the first and second embodiment or different print scans as in the third and fourth embodiment.

Fifth Embodiment

In the above, with reference to FIG. 6A, the serial type inkjet printing apparatus is taken as an example to give the description; however, the present invention can also be applied to a full line type inkjet printing apparatus.

Figure 15:
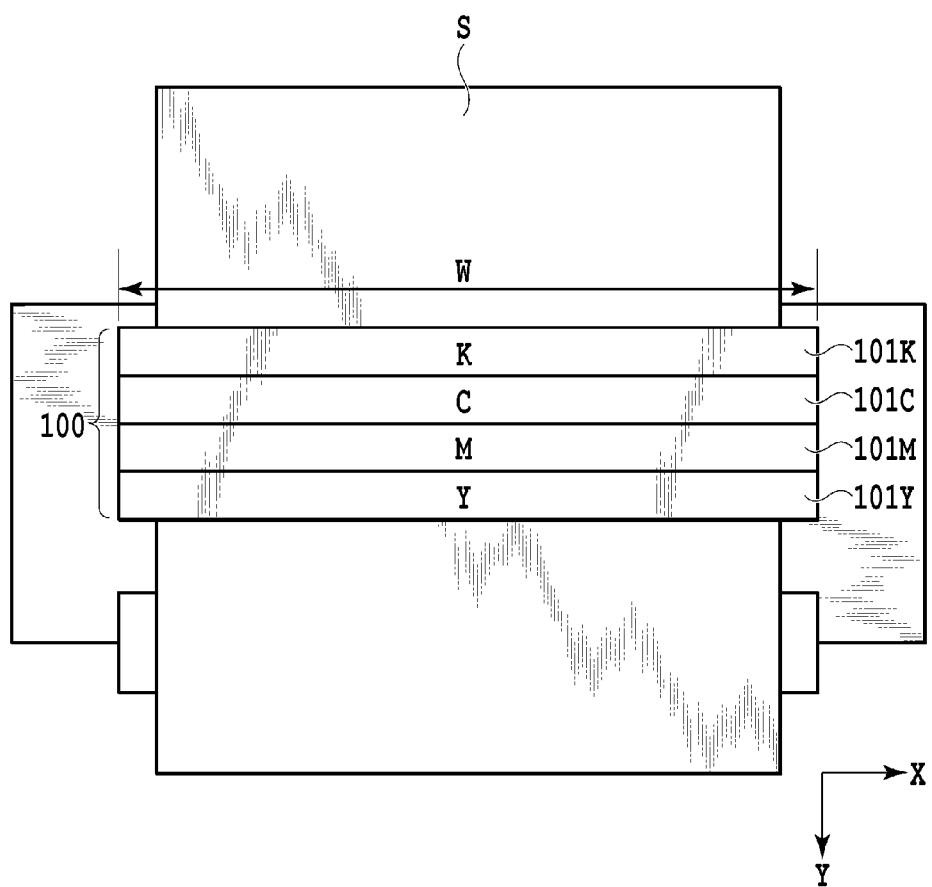
FIG. 15 is a top view of a full line type printing apparatus used in a fifth embodiment.

FIG. 15 is a top view of a full line type printing apparatus used in the present embodiment. On a print head 100, four ejection port arrays 101K to 101Y respectively ejecting black, cyan, magenta, and yellow inks are parallel arranged in a Y direction, and in each of the ejection port arrays 101K to 101Y, multiple ejection ports are arrayed corresponding to the width W of a print medium S. Under such a configuration, the print head 100 ejects inks at a predetermined frequency in accordance with print data in a state of being fixed within the apparatus, and the print medium S moves in the Y direction intersecting with the array direction of the ejection ports at a constant speed corresponding to the ejection frequency. In doing so, a one-page image is formed on the print medium S.

In the diagram, the black ink ejected from the ejection port array 101K positioned on the uppermost stream side in the conveyance direction (Y direction) is first applied to the same area of the print medium S. Subsequent to the application, the cyan ink from the ejection port array 101C, the magenta ink from the ejection port array 101M, and the yellow ink from the ejection port array 101Y are applied. For this reason, in the present embodiment, the black ink ejected by the ejection port array 101K positioned in the uppermost stream side is set for a first color, and other inks are set for a second or subsequent color. In doing so, the blue noise characteristics of precedently applied black dots each of which is conspicuous can be more enhanced than the other inks succeedingly applied. As a result, in either case of a dot pattern of each color material or the sum of dot patterns of the multiple color materials, a high-quality color image of which the graininess is not easily perceived can be outputted.

Sixth Embodiment

A result of determining printing (1) or non-printing (0) in the quantization process unit 306 is based on the relative comparison between processing target data and a threshold value, and therefore the offset process performed in each of the above-described embodiments can be performed not on a threshold value but also on processing target data.

Figure 16:
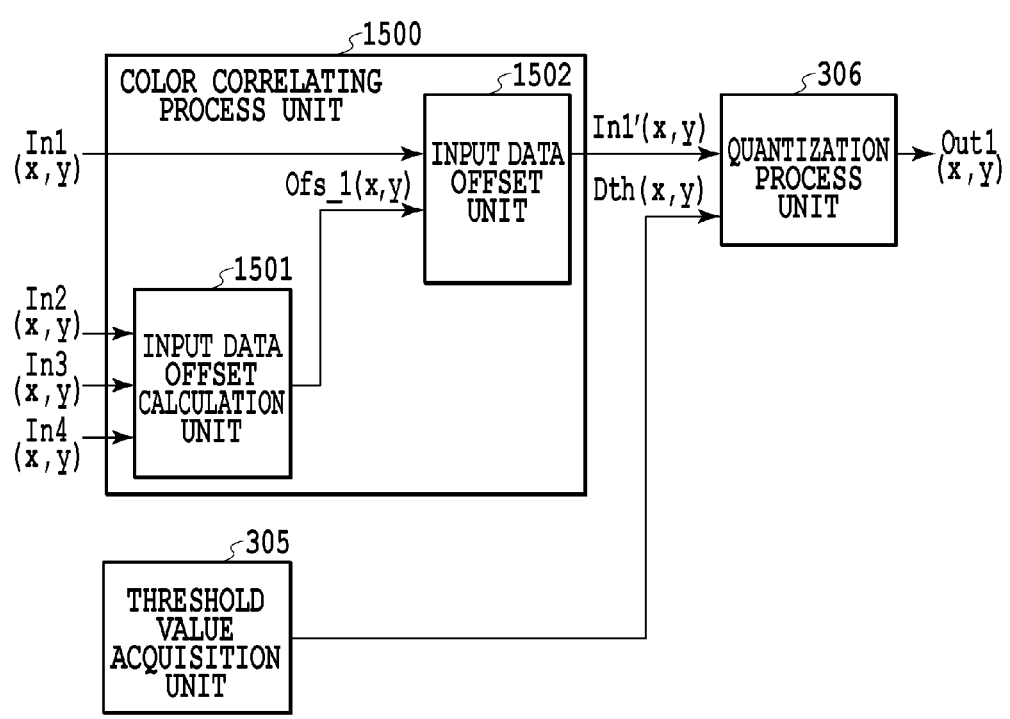
FIG. 16 is a diagram illustrating the configuration of a color correlating process unit in a sixth embodiment.

FIG. 16 is a block diagram for explaining the configuration and steps of a process in a color correlating process unit in the present embodiment. The color correlating process unit 1500 in the present embodiment uses pieces of reference data other than processing target data to perform a predetermined process on the processing target data, and thereby calculates correction data. Specifically, an input data offset amount calculation unit 1501 first calculates an offset amount $Ofs\_1(x, y)$ based on the pieces of reference data $In2(x, y)$ to $In4(x, y)$. In so doing, the offset amount $Ofs\_1(x, y)$ can be made to have the same value as that of the offset amount $Ofs\_1(x, y)$ described in each of the above embodiments. An input data offset amount unit 1502 adds the offset amount $Ofs\_1(x, y)$ to the processing target data (x, y) to thereby generate correction data $In1'(x, y)$, and transmits the correction data $In1'(x, y)$ to a quantization process unit 306. The quantization process unit 306 compares the correction data $In1'(x, y)$ with a threshold value $Dth(x, y)$ acquired by a threshold value acquisition unit 305, and thereby determines printing (1) or non-printing (0) of dot.

In any of the first to fifth embodiments, the threshold value offset value $Ofs\_1(x, y)$ is subtracted from the threshold value acquired by the threshold value acquisition unit 305, and the resultant corrected threshold value and the processing target data are compared with each other. On the other hand, in the present embodiment, the threshold value is not changed, and the correction data resulting from adding the data offset amount to the processing target data is compared with the threshold value. In such a present embodiment as well, the relative relationship between the threshold value and the processing target data in the quantization process, and the result of printing (1) or non-printing (0) obtained from the relative relationship can be made the same as those in each of the above-described embodiments. That is, a dot print pattern in which multiple colors are mixed as well, dot arrangement having blue noise characteristics can be realized.

Also, in the above, the first embodiment where the threshold value is offset, and the sixth embodiment where the processing target data is offset are described as different embodiments. However, the offset amount calculated by the offset amount calculation unit can be distributed to both of the threshold value and the processing target data. In either case, the effect of the present invention can be obtained as long as the relative relationship between the processing target data and the threshold value can be applied with an offset having an appropriate amount based on the pieces of reference data Note that the above description is given on the basis of the configuration where 16-bit data is quantized into several levels by the quantization process, and then a dot pattern corresponding to a level is related by the index expansion process; however, a way to express a multi-valued level is not limited to the index expansion. In the case where dots having multiple sizes are printable, or in the case where inks having multiple different level of densities are ejectable, printing can also be performed with a dot size or ink density related to each level. Even in the case of expressing a quantized level value in any manner, a dot array state can be made to depend on a threshold value array state of an original dither pattern. That is, even in the case of expressing a quantized level value in any manner, by setting an ink precedently applied to a same area of a print medium for a channel for the first colored ink having the lowest threshold value range, the effect of the present invention can be sufficiently obtained.

In addition, the quantization process performed in Step S203 is not necessarily required to be a multi-valued quantization process that converts to several-bit multi-valued data. That is, the quantization process in Step S203 may directly convert 16-bit gradation data to 1-bit binary data through a dither process. In this case, the index expansion process described in Step S204 is omitted, and binary data obtained in Step S203 is directly outputted to the printing apparatus 1.

Further, the above embodiments are described on the basis of the configuration where all the steps illustrated in FIG. 2 are performed in the image processing apparatus 2; however, as long as each of the above processes is performed in the inkjet printing system in the embodiments illustrated in FIG. 1, the steps may be performed in any device. For example, a configuration where the steps up to the quantization in Step S203 are performed by the image processing apparatus 2, and the index process in Step S204 is performed in the printing apparatus 1 is also possible. Also, it may be configured that the printing apparatus 1 includes the functions of the image processing apparatus 2 described above, and all the steps subsequent to Step S201 are performed in the printing apparatus 1. In this case, the printing apparatus 1 serves as the image processing apparatus of the present invention.

In addition, a bit number of input/output data in each of the above-described steps is not limited to that in the above-described embodiments. In order to keep accuracy, an output bit number may be made larger than an input bit number, and a bit number may be variously adjusted depending on application or situations.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-009697, filed Jan. 21, 2015, which is hereby incorporated by reference wherein in its entirety.

What is claimed is:

1. An image processing apparatus for processing data used for printing an image on a print medium with use of multiple inks, the image processing apparatus comprising:
   a processor and a memory storing code of a computer program that, when executed, causes the processor to perform the following steps:
   acquiring first multi-valued data corresponding to a first colored ink to be precedently applied to a same area of the print medium among the multiple inks, and second multi-valued data corresponding to a second colored ink to be applied to the print medium succeedingly to the first colored ink among the multiple inks;
   quantizing the first multi-valued data to generate first quantized data representing printing or non-printing of a dot of the first colored ink, and quantizing the second multi-valued data to generate second quantized data representing printing or non-printing of a dot of the second colored ink,
   wherein, in the quantizing step, (i) quantizing of the first multi-valued data is based on a threshold value matrix configured by arraying multiple threshold values and not based on the second multi-valued data, and (ii) quantizing of the second multi-valued data is based on both of a threshold value matrix configured by arraying multiple threshold values and the first multi-valued data, and
   wherein, in the quantizing step, quantizing of the first multi-valued data and the second multi-valued data is performed so as to, on the same area of the print medium, make dispersibility of dots to be printed based on the first quantized data higher than dispersibility of dots to be printed based on the second quantized data; and
   printing the image on the print medium based on the first quantized data and the second quantized data.

2. The image processing apparatus according to claim 1, wherein
   the processor further executes changing an amount of a relative difference between the threshold value and the second multi-valued data based on the first multi-valued data; and
   wherein, in the quantizing step, the second quantized data is generated on a basis of the amount of the relative difference, that results from the changing in the changing step, between the threshold value and the second multi-valued data.

3. The image processing apparatus according to claim 2, wherein
   in the changing step, changing the amount of the relative difference between the threshold value and the second multi-valued data is performed by offsetting the second multi-valued data using the first multi-valued data.

4. The image processing apparatus according to claim 1, wherein the threshold value matrix is formed so as to keep power in a low frequency range lower than power in a high frequency range in a dot pattern to be printed in accordance with each of the first quantized data and the second quantized data, when each of values of the first multi-valued data and the second multi-valued data indicates middle gradation.

5. The image processing apparatus according to claim 1, wherein the threshold value matrix has a blue noise characteristics.

6. The image processing apparatus according to claim 1, wherein the first colored ink is first applied to the same area of the print medium among the multiple inks.

7. The image processing apparatus according to claim 1, wherein, in the quantizing step, quantizing the first multi-valued data and the second multi-valued data is performed to the first quantized data and the second quantized data having 3-levels or higher levels, respectively.

8. The image processing apparatus according to claim 1, wherein, by alternately performing a print scan that with respect to the print medium, a print head having an ejection port array adapted to eject the first colored ink and an ejection port array adapted to eject the second colored ink scans the print medium, and a conveyance action is performed that conveys the print medium in a direction intersecting with a direction of the print scan so that the image is printed on the print medium, and the ejection port array for the first colored ink is located anterior to the ejection port array for the second colored ink in the direction of the print scan.

9. The image processing apparatus according to claim 1, wherein, by alternately performing a print scan that with respect to the print medium, a print head having an ejection port array adapted to eject the first colored ink and an ejection port array adapted to eject the second colored ink scans the print medium, and a conveyance action is performed that conveys the print medium in a direction intersecting with a direction of the print scan so that the image is printed on the print medium, and the ejection port array for the first colored ink is located upstream of the ejection port array for the second colored ink in the direction of the conveyance.

10. The image processing apparatus according to claim 1, wherein, with respect to a print head having an ejection port array configured by arraying ejection ports adapted to eject the first colored ink by a distance corresponding to a width of the print medium, and an ejection port array configured by arraying ejection ports adapted to eject the second colored ink by the distance corresponding to the width of the print medium, conveying the print medium is performed in a direction intersecting with a direction of the arraying so as to print the image on the print medium, and the ejection port array for the first colored ink is located upstream of the ejection port array for the second colored ink in the direction of the conveyance.

11. The image processing apparatus according to claim 1, wherein the multiple inks are arbitrarily multiple inks selected from among a black ink, a cyan ink, a magenta ink, a yellow ink, a gray ink, a red ink, a green ink, a blue ink, and inks of which contained color material concentrations are different from those inks.

12. The image processing apparatus according to claim 1, wherein, in the quantizing step, quantizing the first multi-valued data and the second multi-valued data is performed so as to, on the same area of the print medium, make dispersibility of dots to be printed based on the first quantized data higher than dispersibility of dots to be printed based on the second quantized data in a case where the first multi-valued data for the same area represent a middle gradation and the second multi-valued data for the same area represent a middle gradation.

13. An image processing method for processing data used for printing an image on a print medium with use of multiple inks, the image processing method being executed by one or more processors and comprising the following steps of:
    acquiring first multi-valued data corresponding to a first colored ink to be precedently applied to a same area of the print medium among the multiple inks, and second multi-valued data corresponding to a second colored ink to be applied to the print medium succeedingly to the first colored ink among the multiple inks;
    quantizing the first multi-valued data to generate first quantized data representing printing or non-printing of a dot of the first colored ink, and quantizing the second multi-valued data to generate second quantized data representing printing or non-printing of dot of the second colored ink,
    wherein, in the quantizing step, (i) quantizing the first multi-valued data is based on a threshold value matrix configured by arraying multiple threshold values and not based on the second multi-valued data, and (ii) quantizing the second multi-valued data is based on both of a threshold value matrix configured by arraying multiple threshold values and the first multi-valued data, and
    wherein, in the quantizing step, quantizing the first multi-valued data and the second multi-valued data so as to, on the same area of the print medium, make dispersibility of dots to be printed based on the first quantized data higher than dispersibility of dots to be printed based on the second quantized data; and
    printing the image on the print medium based on the first quantized data and the second quantized data.

14. The image processing method according to claim 13, wherein further comprising the step of
    changing an amount of a difference between the threshold value and the second multi-valued data based on the first multi-valued data; and
    wherein, in the quantizing step, the second quantized data is generated on a basis of the amount of the difference, that results from the changing in the changing step, between the threshold value and the second multi-valued data.

15. The image processing method according to claim 14, wherein in the changing step, changing the amount of the difference between the threshold value and the second multi-valued data is performed by offsetting the threshold value using the first multi-valued data.

16. The image processing method according to claim 13, wherein the threshold value matrix is formed so as to keep power in a low frequency range lower than power in a high frequency range in a dot pattern to be printed in accordance with each of the first quantized data and the second quantized data, when each of values of the first multi-valued data and the second multi-valued data indicates middle gradation.

17. The image processing method according to claim 13, wherein the threshold value matrix has a blue noise characteristics.

18. The image processing method according to claim 13, wherein the first colored ink is first applied to the same area of the print medium among the multiple inks.

19. The image processing method according to claim 13, wherein, in the quantizing step, the first multi-valued data and the second multi-valued data is quantized to the first quantized data and the second quantized data having 3-levels or higher levels, respectively.

20. The image processing method according to claim 13, wherein, in the quantizing step, the first multi-valued data and the second multi-valued data is quantized so as to, on the same area of the print medium, make dispersibility of dots to be printed based on the first quantized data higher than dispersibility of dots to be printed based on the second quantized data in a case where the first multi-valued data for the same area represent a middle gradation and the second multi-valued data for the same area represent a middle gradation.

21. An image processing apparatus for processing data used for printing an image on a print medium with use of multiple inks, the image processing apparatus comprising:
    one or more processors and one or more memories storing code of a computer program that, when executed, causes the one or more processors to perform the following steps:
    acquiring first multi-valued data corresponding to a first colored ink to be precedently applied to a same area of the print medium among the multiple inks, and second multi-valued data corresponding to a second colored ink to be applied to the print medium succeedingly to the first colored ink among the multiple inks;
    quantizing the first multi-valued data to generate first quantized data representing printing or non-printing of dot of the first colored ink, and quantizing the second multi-valued data to generate second quantized data representing printing or non-printing of dot of the second colored ink,
    wherein, in the quantizing step, (i) quantizing the first multi-valued data is based on a threshold value matrix configured by arraying multiple threshold values and not based on the second multi-valued data, and (ii) quantizing the second multi-valued data is based on both of a threshold value matrix configured by arraying multiple threshold values and the first multi-valued data, and
    wherein, in the quantizing step, the first multi-valued data and the second multi-valued data are quantized in a case where the dot of the first ink and the second ink at least partially overlap each other on the same area of the print medium,
    and wherein the quantizing step further comprises:
    changing an amount of a relative difference between the threshold value and the second multi-valued data based on the first multi-valued data;
    a generation step of generating the second quantized data on a basis of the amount of the relative difference, that results from the changing in the changing step, between the threshold value and the second multi-valued data; and
    printing the image on the print medium based on the first quantized data and the second quantized data.

22. The image processing apparatus according to claim 21, wherein, in the changing step, changing the amount of the relative difference between the threshold value and the second multi-valued data is performed by offsetting the second multi-valued data using the first multi-valued data.

23. The image processing apparatus according to claim 21, wherein, by alternately performing a print scan that with respect to the print medium, a print head having an ejection port array adapted to eject the first colored ink and an ejection port array adapted to eject the second colored ink scans the print medium, and a conveyance action that conveys the print medium in a direction intersecting with a direction of the print scan is performed so that the image is printed on the print medium, and the ejection port array for the first colored ink is located upstream of the ejection port array for the second colored ink in the direction of the conveyance.

24. The image processing apparatus according to claim 23, further comprising the print head and a conveying unit that performs the conveyance action.

25. The image processing apparatus according to claim 21, wherein, with respect to a print head having an ejection port array configured by arraying ejection ports adapted to eject the first colored ink by a distance corresponding to a width of the print medium, and an ejection port array configured by arraying ejection ports adapted to eject the second colored ink by the distance corresponding to the width of the print medium, conveying the print medium is performed in a direction intersecting with a direction of the arraying so as to print the image on the print medium, and the ejection port array for the first colored ink is located upstream of the ejection port array for the second colored ink in the direction of the conveyance.

26. The image processing apparatus according to claim 25, further comprising the print head and a conveying unit that performs the conveyance action.

27. The image processing apparatus according to claim 21, wherein the first colored ink is black ink and the second colored ink is chromatic color ink.

28. An image processing method for processing data used for printing an image on a print medium with use of multiple inks, the image processing method being executed by one or more processors and comprising the steps of:
acquiring first multi-valued data corresponding to a first colored ink to be precedently applied to a same area of the print medium among the multiple inks, and second multi-valued data corresponding to a second colored ink to be applied to the print medium succeedingly to the first colored ink among the multiple inks; and
quantizing the first multi-valued data to generate first quantized data representing printing or non-printing of a dot of the first colored ink, and quantizing the second multi-valued data to generate second quantized data representing printing or non-printing of a dot of the second colored ink,
wherein, in the quantizing step, (i) quantizing the first multi-valued data is based on a threshold value matrix configured by arraying multiple threshold values and not based on the second multi-valued data, and (ii) quantizing the second multi-valued data is based on both of a threshold value matrix configured by arraying multiple threshold values and the first multi-valued data, and
wherein, in the quantizing step, quantizing the first multi-valued data and the second multi-valued data is performed in a case where the dot of the first ink and the second ink at least partially overlap each other on the same area of the print medium,
and wherein the quantizing step further includes:
a changing step of changing an amount of a difference between the threshold value and the second multi-valued data based on the first multi-valued data;
a generation step of generating the second quantized data on a basis of the amount of the difference, that results from the changing in the changing step, between the threshold value and the second multi-valued data; and
printing the image on the print medium based on the first quantized data and the second quantized data.

29. The image processing apparatus according to claim 1, wherein, in the quantizing step, quantizing the first multi-valued data and the second multi-valued data is performed so as to, on the same area of the print medium, make dispersibility of dots to be printed based on the first quantized data higher than dispersibility of dots to be printed based on the second quantized data in a case where the dot of the first ink and the second ink at least partially overlap each other on the same area of the print medium.

30. The image processing apparatus according to claim 1, wherein, in the quantizing step (ii), further performing subtracting a value of the first multi-valued data corresponding to a target pixel from a value of the threshold value corresponding to the target pixel, and quantizing the second multi-valued data based on the threshold matrix which has been subtracted.

31. The image processing apparatus according to claim 1, wherein, in the quantizing step (ii), further performing adding a value of the first multi-valued data corresponding to a target pixel to a value of the second multi-valued data corresponding to the target pixel, and quantizing the second multi-valued data which has been added based on the threshold matrix.

32. The image processing apparatus according to claim 1, wherein the threshold value matrix is formed so as to keep power in a low frequency range in an arrangement of first pixels lower than power in a low frequency range in an arrangement of second pixels, the first pixels being pixels on which a lower threshold value than a predetermined value are determined, and the second pixels being pixels on which a higher threshold value than the predetermined value are determined.

33. The image processing apparatus according to claim 1, wherein the threshold value matrix used for quantizing the first multi-valued data is the same as the threshold value matrix used for quantizing the second multi-valued data.

34. The image processing apparatus according to claim 1, wherein, in the quantizing step, quantizing the first multi-valued data such that (i) in a case where a value of the first multi-valued data corresponding to a target pixel is larger than a threshold value in the threshold value matrix corresponding to the target pixel, the quantized data represents printing of a dot of the first colored ink to the target pixel, and (ii) in a case where a value of the first multi-valued data corresponding to the target pixel is smaller than a threshold value in the threshold value matrix corresponding to the target pixel, the quantized data represents non-printing of a dot of the first colored ink to the target pixel, and
wherein, in the quantizing step, quantizing the second multi-valued data is performed such that (i) in a case where a value of the second multi-valued data corresponding to the target pixel is larger than a value obtained by a threshold value in the threshold value matrix corresponding to the target pixel and a value of the first multi-valued data corresponding to the target pixel, the quantized data represents printing of a dot of the second colored ink to the target pixel, and (ii) in a case where a value of the second multi-valued data corresponding to the target pixel is smaller than a value obtained by a threshold value in the threshold value matrix corresponding to the target pixel and a value of the first multi-valued data corresponding to the target pixel, the quantized data represents non-printing of a dot of the second colored ink to the target pixel.

35. The image processing apparatus according to claim 21,
wherein, in the quantizing step, quantizing the first multi-valued data and the second multi-valued data is performed so as to, on the same area of the print medium, make dispersibility of dots to be printed based on the first quantized data higher than dispersibility of dots to be printed based on the second quantized data.

36. The image processing apparatus according to claim 21,
wherein, in the quantizing step, quantizing the first multi-valued data is performed by comparing the first multi-valued data with a threshold value corresponding to the target pixel in the threshold value matrix, and in the quantizing step, quantizing the second multi-valued data is performed on a basis of the changed amount of the relative difference.

37. An image processing apparatus for processing data used for printing an image on a print medium with use of multiple inks, the image processing apparatus comprising:
one or more processors and one or more memories storing code of a computer program that, when executed, causes the one or more processors to perform the following steps:
acquiring first multi-valued data corresponding to a first colored ink to be precedently applied to a same area of the print medium among the multiple inks, and second multi-valued data corresponding to a second colored ink to be applied to the print medium succeedingly to the first colored ink among the multiple inks;
quantizing the first multi-valued data to generate first quantized data representing printing or non-printing of dot of the first colored ink, and quantizing the second multi-valued data to generate second quantized data representing printing or non-printing of dot of the second colored ink,
wherein, in the quantizing, (i) quantizing the first multi-valued data is based on a threshold value matrix configured by arraying multiple threshold values and not based on the second multi-valued data, and (ii) quantizing the second multi-valued data is based on both of a threshold value matrix configured by arraying multiple threshold values and the first multi-valued data, and
wherein the threshold value matrix is formed so as to keep power in a low frequency range lower than power in a high frequency range in a dot pattern to be printed in accordance with each of the first quantized data and the second quantized data, when each of values of the first multi-valued data and the second multi-valued data indicates middle gradation; and
printing the image on the print medium based on the first quantized data and the second quantized data.

38. An image processing apparatus for processing data used for printing an image on a print medium with use of multiple inks, the image processing apparatus comprising:
one or more processors and one or more memories storing code of a computer program that, when executed, causes the one or more processors to perform the following steps:
acquiring first multi-valued data corresponding to a first colored ink to be precedently applied to a same area of the print medium among the multiple inks, and second multi-valued data corresponding to a second colored ink to be applied to the print medium succeedingly to the first colored ink among the multiple inks;
quantizing the first multi-valued data to generate first quantized data representing printing or non-printing of dot of the first colored ink, and quantizing the second multi-valued data to generate second quantized data representing printing or non-printing of dot of the second colored ink,
wherein, in the quantizing step, (i) quantizing the first multi-valued data is based on a threshold value matrix configured by arraying multiple threshold values and not based on the second multi-valued data, (ii) quantizing the second multi-valued data is based on both of a threshold value matrix configured by arraying multiple threshold values and the first multi-valued data, and
wherein the threshold value matrix is formed so as to keep power in a low frequency range in an arrangement of first pixels lower than power in a low frequency range in an arrangement of second pixels, the first pixels being pixels on which lower threshold value than a predetermined value are determined, and the second pixels being pixels on which higher threshold value than the predetermined value are determined; and
printing the image on the print medium based on the first quantized data and the second quantized data.

* * * * *